(12) United States Patent
Steiner et al.

(10) Patent No.: US 8,009,042 B2
(45) Date of Patent: Aug. 30, 2011

(54) RADIO-FREQUENCY LIGHTING CONTROL SYSTEM WITH OCCUPANCY SENSING

(75) Inventors: James P. Steiner, Royersford, PA (US); Andrew Peter Schmalz, Macungie, PA (US); Andrew Ryan Offenbacher, Quakertown, PA (US); Adam J. Schrems, Allentown, PA (US); Brian Raymond Valenta, Macungie, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 505 days.

(21) Appl. No.: 12/203,518

(22) Filed: Sep. 3, 2008

(65) Prior Publication Data
US 2010/0052576 A1   Mar. 4, 2010

(51) Int. Cl.
*G08B 13/00* (2006.01)
(52) U.S. Cl. ........................................ 340/541; 315/159
(58) Field of Classification Search .................. 340/541; 315/149, 159, 291, 307, 308; 307/116, 117, 307/126, 130, 131
See application file for complete search history.

(56) References Cited

U.S. PATENT DOCUMENTS

| | | | |
|---|---|---|---|
| 5,293,097 A * | 3/1994 | Elwell ............................ | 315/154 |
| 5,386,210 A | 1/1995 | Lee | |
| 5,406,173 A * | 4/1995 | Mix et al. ....................... | 315/156 |
| 5,454,077 A | 9/1995 | Cheron | |
| 5,455,487 A | 10/1995 | Mix et al. | |
| 5,489,827 A | 2/1996 | Xia | |
| 5,489,891 A * | 2/1996 | Diong et al. .................. | 340/567 |
| 5,598,042 A * | 1/1997 | Mix et al. ...................... | 307/116 |
| 5,640,143 A | 6/1997 | Myron et al. | |
| 5,736,965 A | 4/1998 | Mosebrook et al. | |
| 5,790,040 A | 8/1998 | Kreier et al. | |
| 5,848,054 A | 12/1998 | Mosebrook et al. | |
| 5,905,442 A | 5/1999 | Mosebrook et al. | |
| 5,973,594 A | 10/1999 | Baldwin et al. | |
| 5,982,103 A | 11/1999 | Mosebrook et al. | |
| 6,151,529 A | 11/2000 | Batko | |
| 6,340,864 B1 * | 1/2002 | Wacyk .......................... | 315/158 |
| 6,388,399 B1 | 5/2002 | Eckel et al. | |
| 6,390,864 B1 | 5/2002 | Jenkins | |
| 6,404,079 B1 * | 6/2002 | Hsieh ............................ | 307/117 |
| 6,486,778 B2 * | 11/2002 | Mahler et al. ................. | 340/567 |
| 6,687,487 B1 | 2/2004 | Mosebrook et al. | |

(Continued)

FOREIGN PATENT DOCUMENTS
DE         29 18 578        12/1999
(Continued)

*Primary Examiner* — Thuy Vinh Tran
(74) *Attorney, Agent, or Firm* — Ostrolenk Faber LLP

(57) ABSTRACT

A load control system controls an electrical load provided in a space and comprises a load control device and one or more occupancy sensors. The load control device controls the load in response to the wireless control signals received from the occupancy sensors. Each occupancy sensor transmits an occupied control signal to the load control device in response to detecting an occupancy condition in the space and a vacant control signal to the load control device in response to detecting a vacancy condition. The load control device turns on the load in response to receiving the occupied control signal from at least one of the occupancy sensors, and turns off the load in response to receiving vacant control signals from both of the occupancy sensors. The load control device is operable to determine that no wireless control signals have been received from the occupancy sensors for the length of a predetermined timeout period and to subsequently turn off the load.

50 Claims, 25 Drawing Sheets

U.S. PATENT DOCUMENTS

| | | | |
|---|---|---|---|
| 6,703,786 B2 * | 3/2004 | Tannenbaum | 315/149 |
| 6,729,547 B1 | 5/2004 | Charlier et al. | |
| 6,791,458 B2 * | 9/2004 | Baldwin | 340/522 |
| 6,803,728 B2 | 10/2004 | Balasubramaniam et al. | |
| 6,807,463 B1 | 10/2004 | Cunningham et al. | |
| 6,832,072 B2 | 12/2004 | Buckingham et al. | |
| 6,856,236 B2 | 2/2005 | Christensen et al. | |
| 6,859,644 B2 | 2/2005 | Wang | |
| 6,912,429 B1 | 6/2005 | Bilger | |
| 6,952,165 B2 | 10/2005 | Kovach et al. | |
| 6,980,080 B2 | 12/2005 | Christensen et al. | |
| 7,102,502 B2 | 9/2006 | Autret | |
| 7,123,139 B2 | 10/2006 | Sweeney | |
| 7,219,141 B2 | 5/2007 | Bonasia et al. | |
| 7,230,532 B2 | 6/2007 | Albsmeier et al. | |
| 7,239,898 B2 | 7/2007 | Lenchik et al. | |
| 7,268,682 B2 | 9/2007 | Bialecki, Jr. et al. | |
| 7,295,115 B2 | 11/2007 | Aljadeff et al. | |
| 7,356,429 B2 | 4/2008 | Eskildsen | |
| 7,362,285 B2 | 4/2008 | Webb et al. | |
| 7,400,594 B2 | 7/2008 | Pereira et al. | |
| 7,400,911 B2 | 7/2008 | Planning et al. | |
| 7,411,489 B1 | 8/2008 | Elwell et al. | |
| 7,421,247 B2 | 9/2008 | Buckingham et al. | |
| 7,486,193 B2 | 2/2009 | Elwell | |
| 7,511,613 B2 * | 3/2009 | Wang | 340/539.26 |
| 7,541,924 B2 | 6/2009 | Elwell | |
| 2002/0043938 A1 | 4/2002 | Lys | |
| 2003/0040813 A1 | 2/2003 | Gonzales et al. | |
| 2003/0109270 A1 | 6/2003 | Shorty | |
| 2004/0052076 A1 | 3/2004 | Mueller et al. | |
| 2006/0028997 A1 | 2/2006 | McFarland | |
| 2006/0037380 A1 | 2/2006 | Bulst et al. | |
| 2006/0044152 A1 | 3/2006 | Wang | |
| 2006/0174102 A1 | 8/2006 | Smith et al. | |
| 2007/0182580 A1 | 8/2007 | Elwell | |
| 2007/0183329 A1 | 8/2007 | Elwell | |
| 2007/0222584 A1 | 9/2007 | Albsmeier et al. | |
| 2007/0272293 A1 | 11/2007 | Schmidt | |
| 2008/0055073 A1 | 3/2008 | Raneri et al. | |
| 2008/0068126 A1 | 3/2008 | Johnson et al. | |
| 2008/0068204 A1 | 3/2008 | Carmen et al. | |
| 2008/0074059 A1 | 3/2008 | Ahmed | |
| 2008/0111491 A1 | 5/2008 | Spira | |
| 2008/0136663 A1 | 6/2008 | Courtney et al. | |
| 2008/0218099 A1 | 9/2008 | Newman | |

FOREIGN PATENT DOCUMENTS

| | | |
|---|---|---|
| DE | 10 2004 058051 | 8/2006 |
| GB | 2 294 569 | 5/1996 |
| WO | WO 99/60803 | 11/1999 |
| WO | WO 99/60804 | 11/1999 |

\* cited by examiner

RADIO-FREQUENCY LIGHTING CONTROL SYSTEM WITH OCCUPANCY SENSING

BACKGROUND OF THE INVENTION

1. Field of the Invention

The present invention relates to occupancy and vacancy sensors for detecting an occupancy or a vacancy in a space, and more particularly, to a wireless load control system including a plurality of battery-powered occupancy or vacancy sensors for detecting an occupancy or a vacancy in a space, and a load control device for controlling the amount of power delivered to an electrical load in response to the occupancy or vacancy sensors.

2. Description of the Related Art

Occupancy and vacancy sensors are often used to detect occupancy and/or vacancy conditions in a space in order to control an electrical load, such as, for example, a lighting load. An occupancy sensor typically operates to turn on the lighting load when the occupancy sensor detects the presence of a user in the space (i.e., an occupancy event) and then to turn off the lighting load when the occupancy sensor detects that the user has left the space (i.e., a vacancy event). A vacancy sensor only operates to turn off the lighting load when the vacancy sensor detects a vacancy in the space. Therefore, when using a vacancy sensor, the lighting load must be turned on manually (e.g., in response to a manual actuation of a control actuator).

Occupancy and vacancy sensors have often been provided in wall-mounted load control devices that are coupled between an alternating-current (AC) power source and an electrical load for control of the amount of power delivered to the electrical load. Such wall-mounted load control devices typically comprise internal detectors, such as, for example, a pyroelectric infrared (PIR) detector, and a lens for directing energy to the PIR detector for detecting the presence of the user in the space. However, since the wall-mounted load control devices are mounted to a wall in a standard electrical wallbox (i.e., replacing a standard light switch), the detection of energy by the PIR detector may be hindered due to the direction that the load control device is facing and by obstacles in the space, thus increasing the likelihood that the load control device may not detect the presence of a user.

Some prior art occupancy and vacancy sensors have been provided as part of lighting control systems. These sensors are typically coupled via a wired control link to a lighting controller (e.g., a central processor), which then controls the lighting loads accordingly. Since the control link is typically a low-voltage control link, these occupancy and vacancy sensors are not required to be mounted in electrical wallboxes, but may be mounted to the ceiling or high on a wall. Therefore, the occupancy and vacancy sensors may be positioned optimally to detect the presence of the user in all areas of the space. However, these prior art lighting control systems require advanced system components and configuration procedures in order to operate properly.

Thus, there is a need for a simple lighting control system that has occupancy or vacancy sensors which may be easily and optimally installed into a space.

SUMMARY OF THE INVENTION

According to an embodiment of the present invention, a radio-frequency load control system with occupancy sensing comprises a load control device and first and second battery-powered occupancy sensors. The load control device is connected between an AC power source and an electrical load, and contains a radio-frequency (RF) receiver circuit for receiving radio frequency signals. Each of the first and second battery-powered occupancy sensors are fixable to a surface of a room in which the electrical load is located for transmitting an RF signal in response to the presence of an occupant in the room. The second occupancy sensor is spaced from the location of the first occupancy sensor. Each occupancy sensor comprises an enclosed plastic housing including at least one battery, a detector for sensing the presence or absence of occupants in the room, and a RF transmitter circuit for producing the RF signal which is modulated to indicate the presence or absence of the occupant in the room, the RF signals of the occupancy sensors having respective identifying information to identify themselves to the load control device. The load control device receives the RF signals transmitted by the occupancy sensors and controls the current supplied to the electrical load in a predetermined dependence on the detection of an occupancy or a vacancy in the room.

According to another embodiment of the present invention, a load control system for controlling the amount of power delivered from an AC power source to an electrical load provided in a space comprises two occupancy sensors and a load control device operable to enable the delivery of power to the electrical load in response to receiving an occupied wireless control signal from at least one of the occupancy sensors, and to cease the delivery of power to the electrical load in response to receiving vacant control signals from both of the occupancy sensors. The load control device is adapted to be coupled in series electrical connection between the AC power source and the electrical load for control of the amount of power delivered to the electrical load. The load control device receives wireless control signals and controls the amount of power delivered to the electrical load in response to the wireless control signals. Each of the two occupancy sensors independently detects an occupancy condition in the space, transmits the occupied wireless control signal to the load control device in response to detecting the occupancy condition, and transmits the vacant wireless control signal to the load control device in response to detecting a vacancy condition in the space.

In addition, a method of controlling the amount of power delivered from an AC power source to an electrical load provided in a space comprises the steps of: (1) providing two occupancy sensors in the space; (2) detecting by one of the occupancy sensors an occupancy condition in the space; (3) transmitting by one of the occupancy sensors an occupied wireless control signal in response to the step of detecting the occupancy condition; (4) receiving the occupied wireless control signal from at least one of the occupancy sensors; (5) enabling the delivery of power to the electrical load in response to the step of receiving the occupied wireless control signal from at least one of the occupancy sensors; (6) detecting by one of the occupancy sensors a vacancy condition in the space; (7) transmitting by one of the occupancy sensors a vacant wireless control signal in response to the step of detecting a vacancy condition in the space; (8) receiving vacant control signals from both of the occupancy sensors; and (9) ceasing the delivery of power to the electrical load in response to the step of receiving vacant control signals from both of the occupancy sensors.

A sensor system for controlling a lighting load located within a room is also described herein. The sensor system comprises an RF-responsive light control device for turning on and turning off the lighting load, and at least first and second spaced occupancy sensors disposed to monitor occupancy in different areas of the room. Each of the first and second sensors produce first and second respective occupied and vacant RF signals to the light control device in response to the sensing of a respective presence or absence of an occupant in the room. The light control device turns on the lighting load in response to receiving an occupied RF signal from either of the first or second sensors, and turns off the lighting load in response to receiving an vacant RF signal from both of the sensors.

Further, a process of controlling a lighting load in a room dependent upon the occupancy or vacancy of the room comprises the steps of: (1) providing first and second spaced occupancy sensors mounted within the room; (2) monitoring by the first and second occupancy sensors for the presence of one or more persons in the room; (3) transmitting by the first and second occupancy sensors respective RF signals including occupancy or vacancy information with an identifier of the respective sensor producing such information; (4) receiving the RF signals by a load control device; (5) turning on by the load control device the lighting load in response to receiving an occupied RF output signal from either the first or the second sensor; and (6) turning off by the load control device the lighting load in response to receiving vacant RF signals from both of the first and second sensors.

According to another embodiment of the present invention, a load control system for controlling the amount of power delivered from an AC power source to an electrical load provided in a space comprises an occupancy sensor and a load control device operable to determine that no wireless control signals have been received from the occupancy sensor for the length of a predetermined timeout period and to subsequently cease the delivery of power to the electrical load. The load control device receives the wireless control signals and controls the amount of power delivered to the electrical load in response to the wireless control signals. The occupancy sensor detects an occupancy condition in the space and transmits a first wireless control signal to the load control device in response to detecting the occupancy condition, and transmits a second wireless control signal to the load control device in response to detecting a continued occupancy condition in the space. The load control device enables the delivery of power to the electrical load in response to the first wireless control signal, determines that no wireless control signals have been received from the occupancy sensor for the length of the predetermined timeout period, and subsequently ceases the delivery of power to the electrical load.

In addition, a method of controlling the amount of power delivered from an AC power source to an electrical load provided in a space comprises the steps of: (1) providing an occupancy sensor in the space; (2) detecting by the occupancy sensor an occupancy condition in the space; (3) transmitting by the occupancy sensor a first wireless control signal in response to the step of detecting the occupancy condition; (4) enabling the delivery of power to the electrical load in response to the first wireless control signal; (5) detecting by the occupancy sensor a continued occupancy condition in the space; (6) transmitting by the occupancy sensor a second wireless control signal in response to the step of detecting a continued occupancy condition in the space; (7) determining that no wireless control signals have been received from the occupancy sensor for the length of a predetermined timeout period; and (8) ceasing the delivery of power to the electrical load in response to the step of determining that no wireless control signals have been received.

According to another embodiment of the present invention, a load control system for controlling the amount of power delivered from an AC power source to an electrical load provided in a space comprises a load control device an occupancy sensor comprising an occupancy detector for detecting an occupancy condition in the space and an ambient light level detector for measuring the ambient light level in the space. The load control device receives wireless control signals and controls the amount of power delivered to the electrical load in response to the wireless control signals. The occupancy sensor compares the ambient light level to an ambient light level threshold, transmits a first predetermined wireless control signal to the load control device in response to determining that the ambient light level is less than the threshold, and transmits a second predetermined wireless control signal to in response to determining that the ambient light level is greater than the threshold.

In addition, a wall or ceiling mounted occupancy sensor comprises: (1) at least one battery; (2) a controller coupled to the battery; (3) a PIR occupancy detector for sensing the presence or absence of an occupant in a room, the occupancy detector circuit coupled to the controller and delivering occupancy or vacancy information to the controller; (4) an RF transmitter coupled to the battery and the controller for transmitting an RF signal containing information related to the presence or absence of an occupant in the room; (5) an ambient light detector coupled to the controller, the controller compares the level of ambient light within the area to an ambient light threshold, whereby the RF signal transmitted by the RF transmitter is modified in accordance with the comparison of the level of ambient light within the area and the ambient light threshold; and (6) an enclosure housing containing the battery, the controller, and the PIR detector, the RF transmitter, and the ambient light detector, the housing having mounting structure for mounting the sensor to a wall or ceiling surface of a room.

According to another embodiment of the present invention, a load control system for controlling the amount of power delivered from an AC power source to an electrical load provided in a space comprises an occupancy sensor and a load control device operable to store operating characteristics of the load control system. The load control device receives wireless control signals and controls the amount of power delivered to the electrical load in response to the wireless control signals. The occupancy sensor comprises an occupancy detector circuit for generating an occupancy control signal representative of an occupancy condition in the space, a controller responsive to the occupancy control signal, and a wireless transmitter for transmitting the wireless control signals. The controller determines whether the occupancy condition is presently occurring in the space based upon each of a plurality of occupancy criteria and generates a result for each of the determinations of the occupancy condition at each of the plurality of occupancy criteria. The occupancy sensor transmits to the load control device each of the results of the determinations of the occupancy condition at each of the plurality of occupancy criteria. The load control device is characterized by a predetermined one of the plurality of occupancy criteria, and selects one of the results of each of the determinations of the occupancy condition at each of the plurality of occupancy criteria based upon the predetermined one of the plurality of occupancy criteria. The load control device controls the amount of power delivered to the electrical load in response to the selected results of the determination of the occupancy condition.

Further, a method of controlling the amount of power delivered from an AC power source to an electrical load provided in a space comprises the steps of: (1) generating an occupancy control signal representative of an occupancy condition in the space; (2) determining whether the occupancy condition is presently occurring in the space based upon each of a plurality of occupancy criteria; (3) generating a result for each of the determinations of the occupancy condition at each of the plurality of occupancy criteria; (4) transmitting each of the results of the determinations of the occupancy condition at each of the plurality of occupancy criteria; (5) selecting one of the results of each of the determinations of the occupancy condition at each of the plurality of occupancy criteria based upon a predetermined one of the plurality of occupancy criteria; and (6) controlling the amount of power delivered to the electrical load in response to the step of selecting one of the results.

Other features and advantages of the present invention will become apparent from the following description of the invention that refers to the accompanying drawings.

DETAILED DESCRIPTION OF THE INVENTION

Figure 1A:
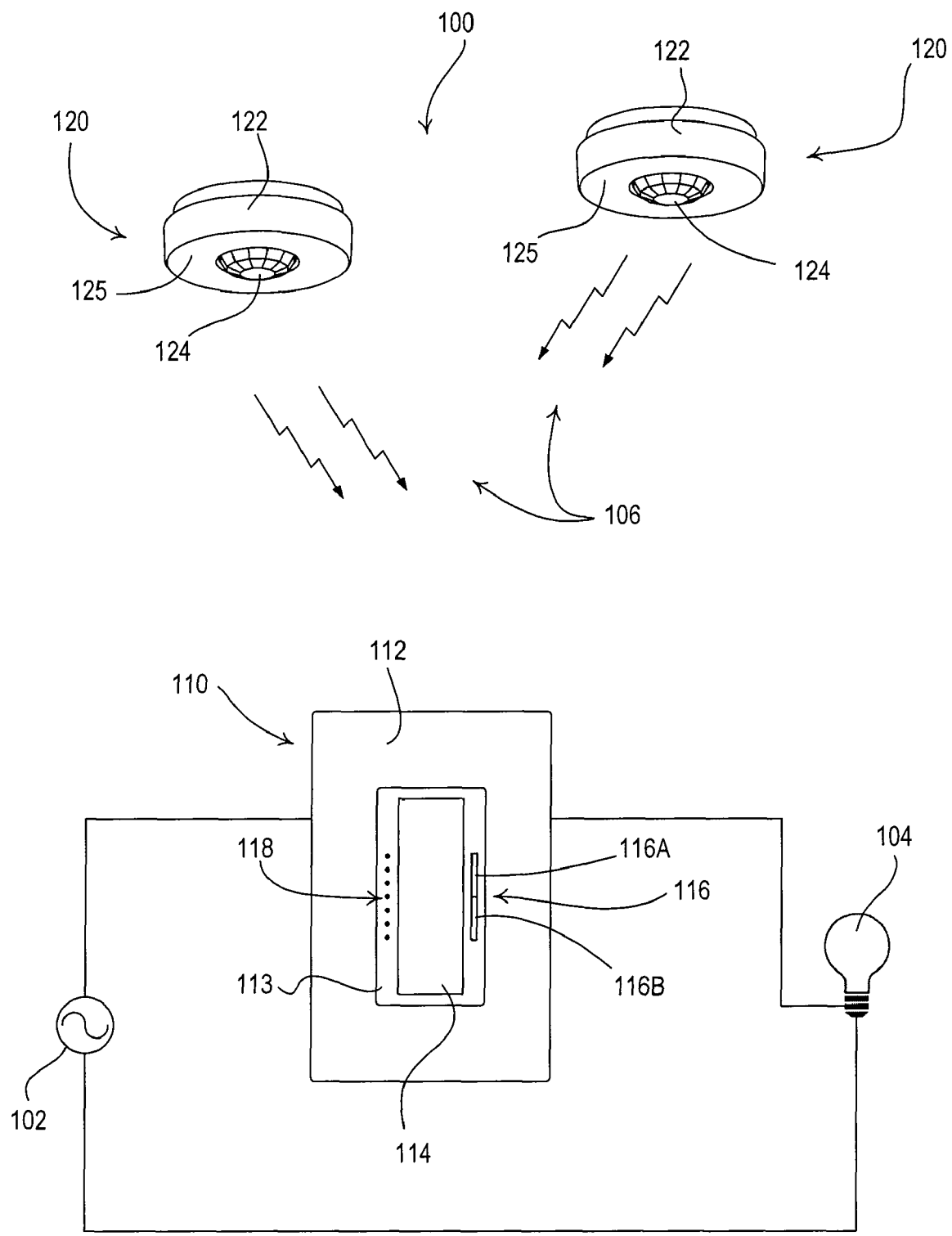
FIG. 1A is a simple diagram of a radio-frequency (RF) lighting control system having a dimmer switch and remote occupancy sensors for control of the amount of power delivered to a lighting load according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1A is a simple diagram of a radio-frequency (RF) lighting control system 100 comprising a dimmer switch 110 and two remote occupancy sensors 120 (e.g., passive infrared sensors). The dimmer switch 110 is adapted to be coupled in series electrical connection between an AC power source 102 and a lighting load 104 for controlling the amount of power delivered to the lighting load. The dimmer switch 110 may be adapted to be wall-mounted in a standard electrical wallbox. Alternatively, the dimmer switch 110 could be implemented as a table-top load control device. The dimmer switch 110 comprises a faceplate 112 and a bezel 113 received in an opening of the faceplate. The dimmer switch 110 further comprises a toggle actuator 114, i.e., a button, and an intensity adjustment actuator 116. Actuations of the toggle actuator 114 toggle, i.e., turn off and on, the lighting load 104. Actuations of an upper portion 116A or a lower portion 116B of the intensity adjustment actuator 116 respectively increase or decrease the amount of power delivered to the lighting load 104 and thus increase or decrease the intensity of the lighting load 104 from a minimum intensity (e.g., 1%) to a maximum intensity (e.g., 100%). A plurality of visual indicators 118, e.g., light-emitting diodes (LEDs), are arranged in a linear array on the left side of the bezel 113. The visual indicators 118 are illuminated to provide feedback of the intensity of the lighting load 104. An example of a dimmer switch having a toggle actuator 114 and an intensity adjustment actuator 116 is described in greater detail in U.S. Pat. No. 5,248,919, issued Sep. 29, 1993, entitled LIGHTING CONTROL DEVICE, the entire disclosure of which is hereby incorporated by reference.

The remote occupancy sensors 120 are removably mountable to a ceiling or a wall, for example, in the vicinity of (i.e., a space around) the lighting load 104 controlled by the dimmer switch 110, and are operable to detect occupancy conditions in the vicinity of the lighting load. The occupancy sensors 120 may be spaced apart to detect occupancy conditions in different areas of the vicinity of the lighting load 104. The remote occupancy sensors 120 each include an internal detector, e.g., a pyroelectric infrared (PIR) detector 310 (FIG. 3), which is housed in an enclosure 122 (e.g., an enclosed plastic housing) and will be described in greater detail below. The enclosure 122 comprises a lens 124 (e.g., an outwardly domed lens) provided in a front surface 125 of the enclosure 122 (which defines a top plate of the occupancy sensor 120). The internal detector is operable to receive infrared energy from an occupant in the space via the lens 124 to thus sense the occupancy condition in the space. The occupancy sensors 120 are operable to process the output of the PIR detector 310 to determine whether an occupancy condition (i.e., the presence of the occupant) or a vacancy condition (i.e., the absence of the occupant) is presently occurring in the space, for example, by comparing the output of the PIR detector 310 to a predetermined occupancy voltage threshold. Alternatively, the internal detector could comprise an ultrasonic detector, a microwave detector, or any combination of PIR detectors, ultrasonic detectors, and microwave detectors.

Figure 1B:
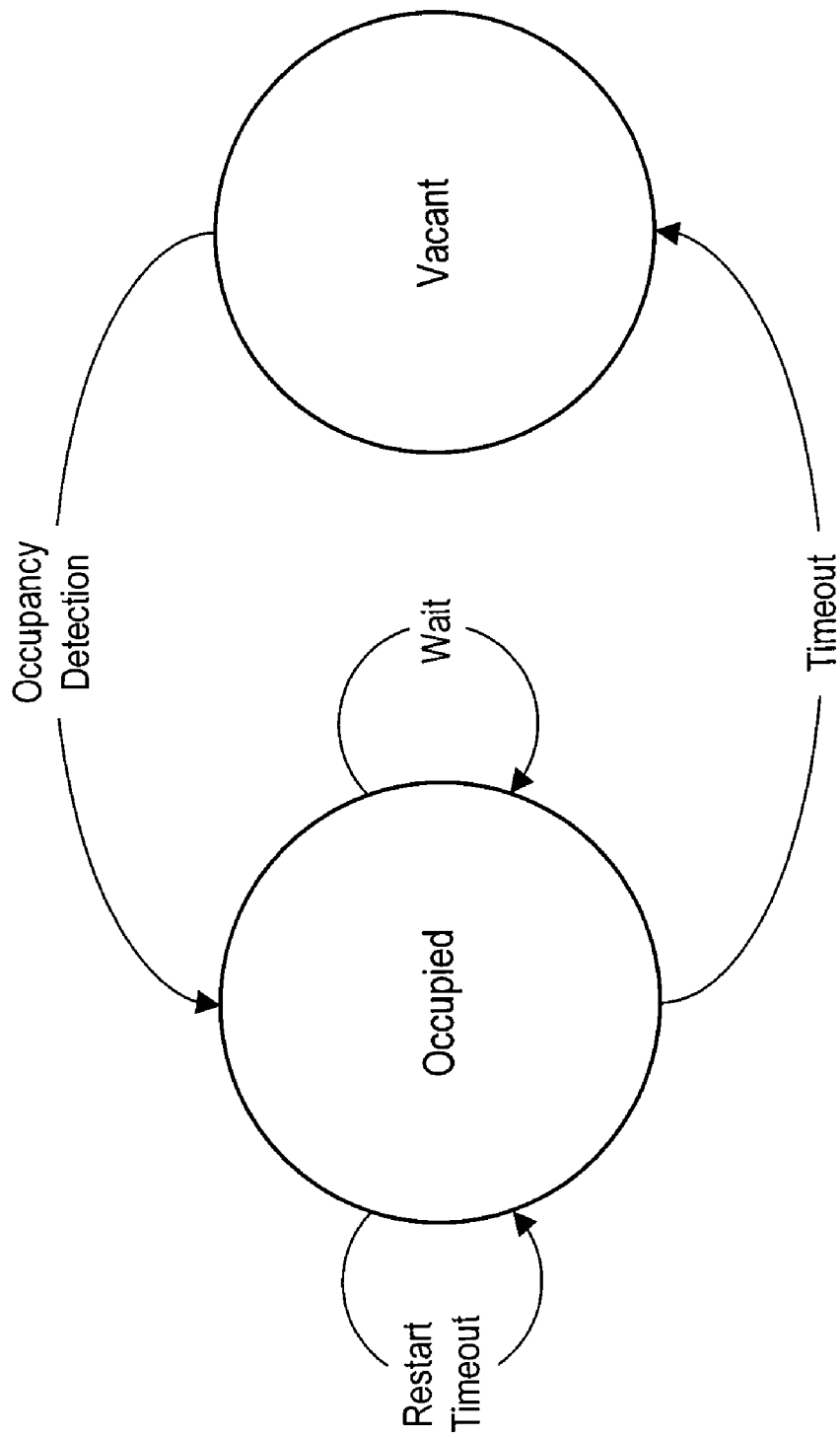
FIG. 1B is a simplified state diagram illustrating the operation of one of the occupancy sensors of the RF lighting control system of FIG. 1A.

FIG. 1B is a simplified state diagram illustrating the operation of the occupancy sensors 120 of the RF lighting control system 100. The occupancy sensors 120 each operate in an "occupied" state or a "vacant" state in response to the detections of occupancy or vacancy conditions, respectively, in the space. If one of the occupancy sensors 120 is in the vacant state and the occupancy sensor determines that the space is occupied in response to the PIR detector 310, the occupancy sensor changes to the occupied state.

During a setup procedure of the RF lighting control system 100, the dimmer switch 110 may be assigned to (i.e., associated with) one or more remote occupancy sensors 120. The remote occupancy sensors 120 transmit digital messages wirelessly via RF signals 106 to the dimmer switch 110 in response to the present state of the occupancy sensors. A message transmitted by the remote occupancy sensors 120 may include a command and identifying information, for example, a 52-bit serial number (i.e., a unique identifier) associated with the transmitting occupancy sensor. The dimmer switch 110 is responsive to messages containing the serial numbers of the remote occupancy sensors 120 to which the dimmer switch is assigned.

The commands included in the digital messages transmitted by the occupancy sensors 120 may comprise an occupied command (e.g., an occupied-take-action command or an occupied-no-action command) or a vacant command. When the lighting load 104 is off, the dimmer switch 110 is operable to turn on the lighting load in response to receiving a first occupied-take-action command from any one of the occupancy sensors 120. The dimmer switch 110 is operable to turn off the lighting load 104 in response to the last vacant command received from those occupancy sensors 120 from which the occupancy sensor received either occupied-take-action or occupied-no-action commands. For example, if the occupancy sensors 120 both transmit occupied-take-action commands to the dimmer switch 110, the dimmer switch will not turn off the lighting load 104 until subsequent vacant commands are received from both of the occupancy sensors.

Each occupancy sensor 120 also comprises an ambient light detector 234 (FIG. 2B), e.g., a photocell, for detecting the level of ambient light around the occupancy sensor. The occupancy sensor 120 only measures the ambient light level when an occupancy condition is first detected. The ambient light level is compared to a predetermined ambient light level threshold. If the measured ambient light level is less than the predetermined level when an occupancy condition is first detected by one of the occupancy sensors 120, the occupancy sensor transmits the occupied-take-action command to the dimmer switch 110. On the other hand, if the measured ambient light level is greater than the predetermined level when an occupancy condition is first detected, the occupancy sensor 120 transmits the occupied-no-action command to the dimmer switch 110. Accordingly, the dimmer switch 110 does not turn on the lighting load 104 if the ambient light level in the space is sufficiently high.

While one of the occupancy sensors 120 continues to detect the occupancy condition in the space (i.e., a continued occupancy condition), the occupancy sensor regularly transmits the occupied-no-action command to the dimmer switch 110, such that the dimmer switch knows that the occupancy sensor 120 is still in the occupied state. In response to receiving the occupied-no-action command, the dimmer switch 110 either maintains the lighting load 104 on (e.g., if an occupied-take-action command was previously received) or maintains the lighting load off.

The occupancy sensors 120 are each characterized by a predetermined occupancy sensor timeout period $T_{TIMEOUT}$, which provides some delay in the adjustment of the state of the occupancy sensor, specifically, in the transition from the occupied state to the vacant state. The predetermined occupancy sensor timeout period $T_{TIMEOUT}$ may be user-selectable ranging, for example, from five to thirty minutes. Each occupancy sensor 120 will not transmit a vacant command until the occupancy sensor timeout period $T_{TIMEOUT}$ has expired. Each occupancy sensor 120 maintain an occupancy timer to keep track of the time that has expired since the last detected occupancy condition. The occupancy sensors 120 periodically restart the occupancy timers in response to determining an occupancy condition (as shown by "Restart Timer" in the state diagram of FIG. 1B). Accordingly, the occupancy sensors 120 do not change to the vacant state, and the lighting load 104 is not turned off, in response to brief periods of a lack of movement of the occupant in the space. If the occupancy sensor 120 fails to continue detecting the occupancy conditions, the occupancy sensor 120 waits for the length of the occupancy sensor timeout period $T_{TIMEOUT}$ (as shown by "Wait" in the state diagram of FIG. 1B). After the occupancy timer expires, the occupancy sensor 120 changes to the vacant state and transmits a vacant command to the dimmer switch 110 (as shown by "Timeout" in the state diagram of FIG. 1B).

Figure 1C:
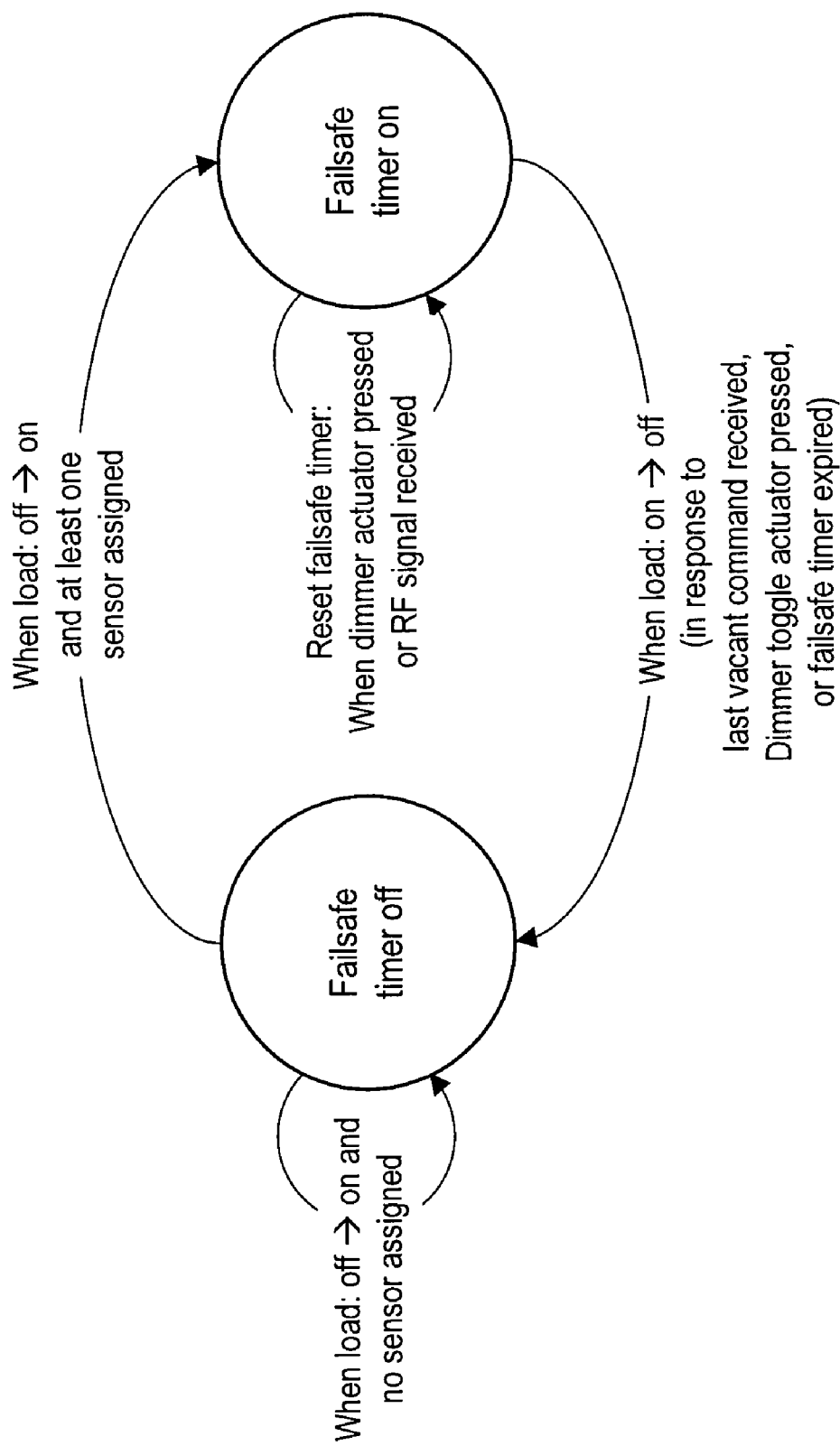
FIG. 1C is a simplified state diagram illustrating the state of a failsafe timer of the dimmer switch of the RF lighting control system of FIG. 1A.

If the dimmer switch 110 does not receive a digital message from any of the occupancy sensors 120 for a failsafe timeout period $T_{FAILSAFE}$, the dimmer switch 110 assumes that all of the occupancy sensors are in the vacant state and turns off the lighting load 104. To accomplish this control, the dimmer switch 110 maintains a failsafe timer. FIG. 1C is a simplified state diagram illustrating the state of the failsafe timer of the dimmer switch 110. The failsafe timer is started when the lighting load 104 is controlled from off to one and at least one occupancy sensor 120 is assigned to the dimmer switch 110. If there are not any occupancy sensors 120 assigned to the dimmer switch 110 when the lighting load 104 is turned on, the failsafe timer is not started. The failsafe timer is reset to the value of the failsafe timeout period $T_{FAILSAFE}$ in response to receiving a digital message from any of the occupancy sensors 120 assigned to the dimmer switch 110 or in response to actuations of any the dimmer actuators (which do not cause the lighting load 104 to be turned off). When the failsafe timer expires, the dimmer switch 110 assumes that all of the occupancy sensors are in the vacant state and turns off the lighting load 104. The failsafe timer is stopped whenever the lighting load 104 is turned off (i.e., when vacant commands are received from all occupancy sensors 120, when one of the dimmer actuators is actuated to turn off the lighting load, or when the failsafe timer expires).

Figure 1D:
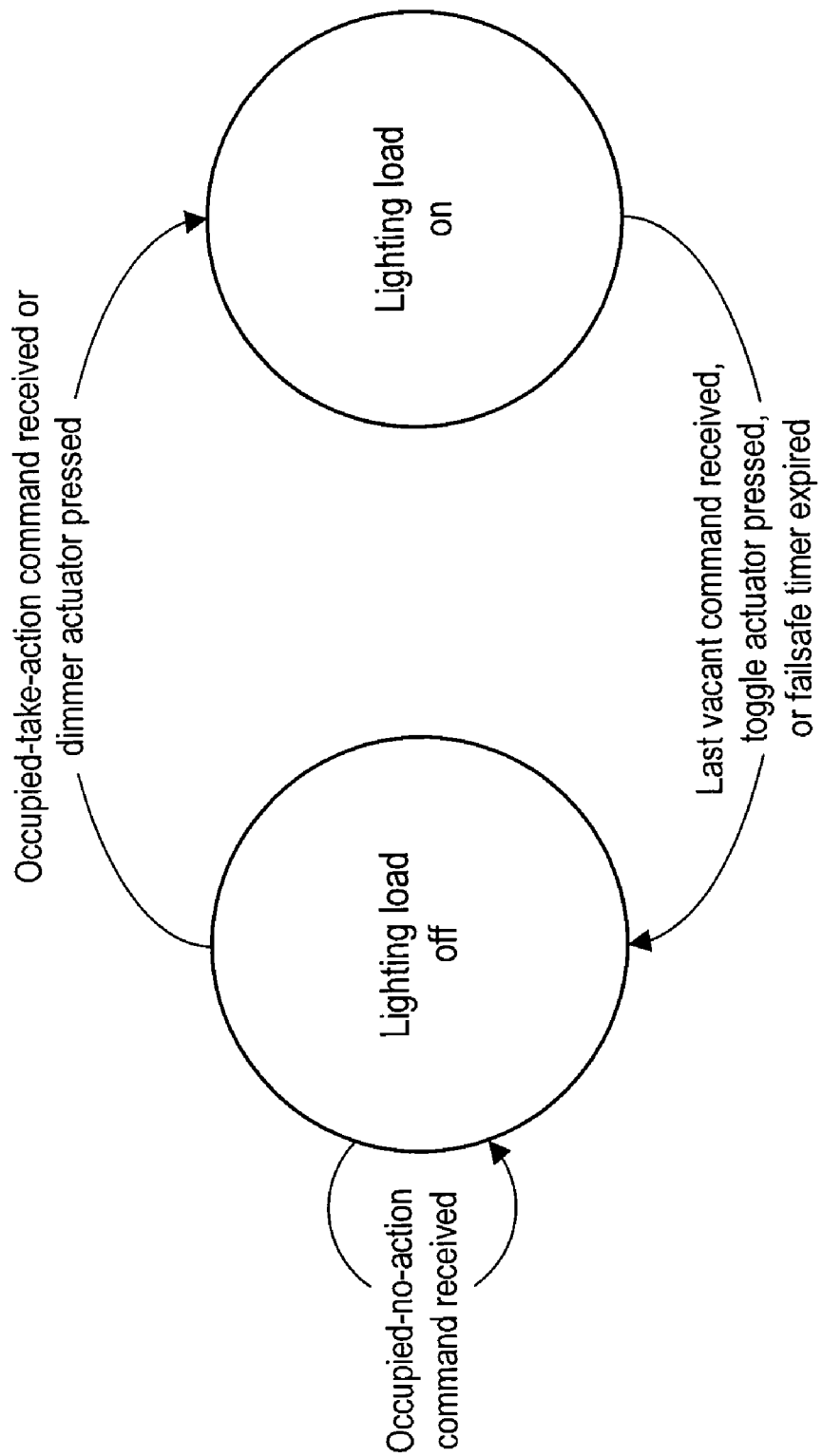
FIG. 1D is a simplified state diagram illustrating how the dimmer switch of the RF lighting control system of FIG. 1A controls the lighting load.

The dimmer switch 110 controls the lighting load 104 in response to the received digital messages as well as actuations of the dimmer actuators (i.e., toggle actuator 114 and the intensity adjustment actuator 116) and the failsafe timer. FIG. 1D is a simplified state diagram illustrating how the dimmer switch 110 controls the state of the lighting load 104 (i.e., between on and off). The dimmer switch 110 does not control the intensity of the lighting load 104 in response to the occupied-no-action commands. The dimmer switch 110 turns on the lighting load 104 when the first occupied-take-action command is received or when one of the dimmer actuators is actuated to turn on the lighting load. Further, the dimmer switch 110 turns off the lighting load 104 when the last vacant command is received from the occupancy sensors 120, when one of the dimmer actuators is actuated to turn off the lighting load, or when the failsafe timer expires.

Figure 2A:
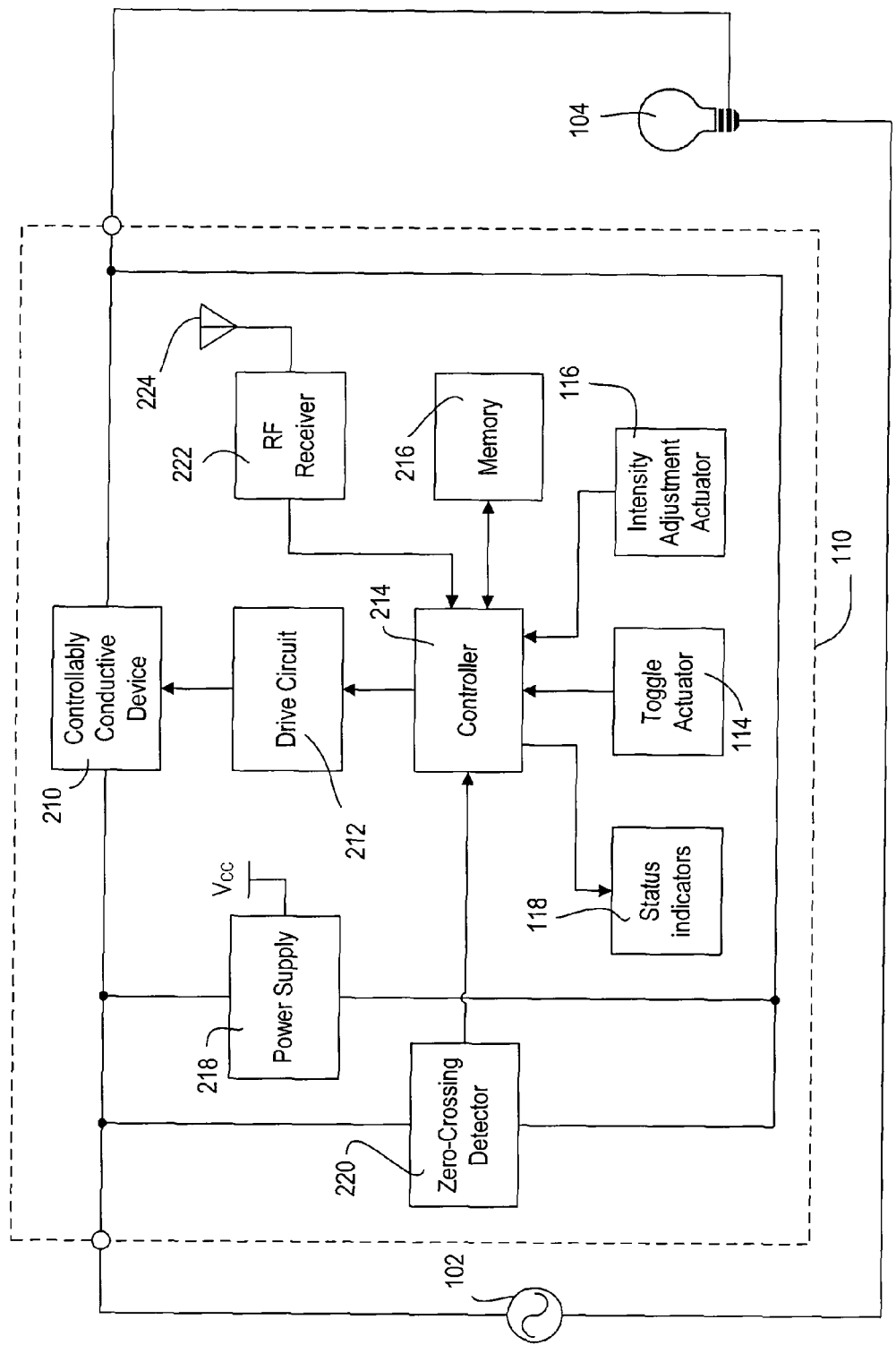
FIG. 2A is a simplified block diagram of the dimmer switch of the RF lighting control system of FIG. 1A.

FIG. 2A is a simplified block diagram of the dimmer switch 110. The dimmer switch 110 comprises a controllably conductive device 210 coupled in series electrical connection between the AC power source 102 and the lighting load 104 for control of the power delivered to the lighting load. The controllably conductive device 210 may comprise any suitable type of bidirectional semiconductor switch, such as, for example, a triac, a field-effect transistor (FET) in a rectifier bridge, or two FETs in anti-series connection. The controllably conductive device 210 includes a control input coupled to a drive circuit 212. The input to the control input will render the controllably conductive device 210 conductive or non-conductive, which in turn controls the power supplied to the lighting load 104.

The drive circuit 212 provides control inputs to the controllably conductive device 210 in response to command signals from a controller 214. The controller 214 is preferably implemented as a microcontroller, but may be any suitable processing device, such as a programmable logic device (PLD), a microprocessor, or an application specific integrated circuit (ASIC). The controller 214 receives inputs from the toggle actuator 114 and the intensity adjustment actuator 116 and controls the status indicators 118. The controller 214 is also coupled to a memory 216 for storage of the preset intensity of lighting load 104 and the serial number of the occupancy sensor 120 to which the dimmer switch 110 is assigned. The memory 216 may be implemented as an external integrated circuit (IC) or as an internal circuit of the controller 214. A power supply 218 generates a direct-current (DC) voltage $V_{CC}$ for powering the controller 214, the memory 216, and other low-voltage circuitry of the dimmer switch 110.

A zero-crossing detector 220 determines the zero-crossings of the input AC waveform from the AC power supply 102. A zero-crossing is defined as the time at which the AC supply voltage transitions from positive to negative polarity, or from negative to positive polarity, at the beginning of each half-cycle. The zero-crossing information is provided as an input to controller 214. The controller 214 provides the control inputs to the drive circuit 212 to operate the controllably conductive device 210 (i.e., to provide voltage from the AC power supply 102 to the lighting load 104) at predetermined times relative to the zero-crossing points of the AC waveform.

The dimmer switch 110 further comprises an RF receiver 222 and an antenna 224 for receiving the RF signals 106 from the occupancy sensor 120. The controller 214 is operable to control the controllably conductive device 210 in response to the messages received via the RF signals 106. Examples of the antenna 224 for wall-mounted dimmer switches, such as the dimmer switch 110, are described in greater detail in U.S. Pat. No. 5,982,103, issued Nov. 9, 1999, and U.S. patent application Ser. No. 10/873,033, filed Jun. 21, 2006, both entitled COMPACT RADIO FREQUENCY TRANSMITTING AND RECEIVING ANTENNA AND CONTROL DEVICE EMPLOYING SAME. The entire disclosures of both are hereby incorporated by reference.

Figure 2B:
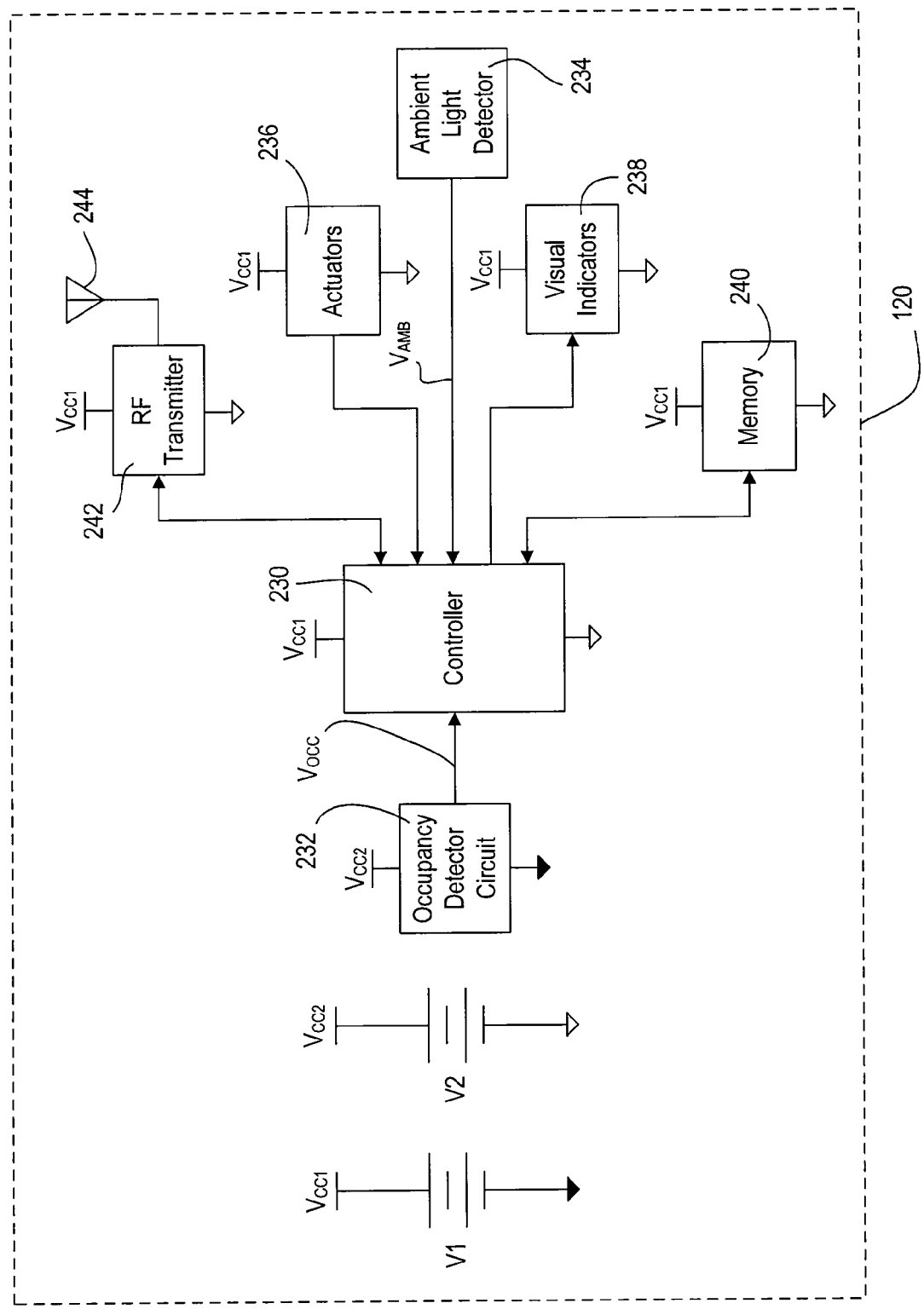
FIG. 2B is a simplified block diagram of one of the remote occupancy sensors of the RF lighting control system of FIG. 1A.

FIG. 2B is a simplified block diagram of one of the remote occupancy sensors 120. The remote occupancy sensor 120 comprises a controller 230 and an occupancy detector circuit 232, which provides the controller with an occupancy control signal $V_{OCC}$ representative of whether the space is occupied or not. The controller 230 receives an ambient light level control signal $V_{AMB}$ representative of the level of ambient light around the occupancy sensor from the ambient light detector 234. A plurality of actuators 236 provide user inputs to the occupancy sensor 120 for use during configuration and installation of the lighting control system 100 as will be described in greater detail below. The controller 230 is operable to illuminate a plurality of visual indicators 238, e.g., light-emitting diodes (LEDs), to provide feedback to the user during configuration and installation of the occupancy sensor 120.

According to a first embodiment of the present invention, the occupancy sensors 120 are each operable to store in a memory 240 the values of the various operating characteristics of the lighting control system 100, e.g., the occupancy voltage threshold, the ambient light level threshold, and the occupancy sensor timeout period $T_{TIMEOUT}$. The memory 240 may be implemented as an external integrated circuit (IC) or as an internal circuit of the controller 230. To adjust the values of the operating characteristics, the user must access the occupancy sensor 120 to actuate the actuators 236. The occupancy sensors 120 use the operating characteristics to change between the occupied state and the vacant state as will be described in greater detail below. The occupancy sensors 120 also store the serial number in the memory 240. The serial number may be programmed into the memory 240, for example, during manufacture of the occupancy sensor 120.

The remote occupancy sensor 120 further comprises an RF transmitter 242 coupled to the controller 230 and an antenna 244. In response to determining an occupancy or a vacancy condition of the space, the controller 230 causes the RF transmitter 242 to transmit a digital message to the dimmer switch 110 via the RF signals 106. Each transmitted message comprises the serial number of the remote occupancy sensor 120 and the appropriate command dependent upon the various operating characteristics of the occupancy sensor and the magnitudes of the occupancy control signal $V_{OCC}$ and the ambient light level control signal $V_{AMB}$. Alternatively, the RF transmitter 242 of the occupancy sensors 120 and the RF receiver 222 of the dimmer switch 110 could both comprise RF transceivers to allow for two-way communication between the occupancy sensors and the dimmer switch.

The occupancy sensor 120 also comprises two batteries: a first battery V1 and a second battery V2. The first battery V1 provides a first battery voltage $V_{CC1}$ referenced to a first circuit common, and the second battery V2 provides a second battery voltage $V_{CC2}$ referenced to a second circuit common. For example, the magnitudes of the first and second battery voltages $V_{CC1}$, $V_{CC2}$ may be the same, e.g., approximately 3 volts. The second battery V2 powers only the occupancy detector circuit 232, while the first battery V1 powers the controller 230, the RF transmitter 242, and the other circuitry of the occupancy sensor 120. Since the occupancy detector circuit 232 is powered by a separate battery from the other circuitry, the occupancy detector circuit is isolated from the noisy circuitry (e.g., the controller 230 and the RF transmitter 242) of the occupancy sensor 120 without excessive electronic filtering. Accordingly, the amount of noise present in the occupancy detector circuit 232 is dramatically reduced without the use of advanced filters.

The magnitude of the current drawn by the occupancy detector circuit 232 is approximately equal to the magnitude of the total current drawn by the other circuitry of the occupancy sensor 120. For example, the magnitude of the average current drawn from each of the batteries V1, V2 is less than approximately 7 µA. The controller 230 is operable to monitor the magnitude of the first battery voltage $V_{CC1}$ of the first battery V1 and to transmit a digital message representative of a low-battery condition to the dimmer switch 110 when the magnitude of the first battery voltage $V_{CC}$ drops below a predetermined level. In response to receiving the low-battery digital message, the dimmer switch 110 may, for example, blink one or more of the visual indicators 118 to indicate that the batteries V1, V2 are low. Since magnitudes of the currents drawn from the batteries V1, V2 are approximately the same, the dimmer switch 110 assumes that the magnitudes of the first and second battery voltages $V_{CC1}$, $V_{CC2}$ are decreasing in a similar fashion.

Figure 3:
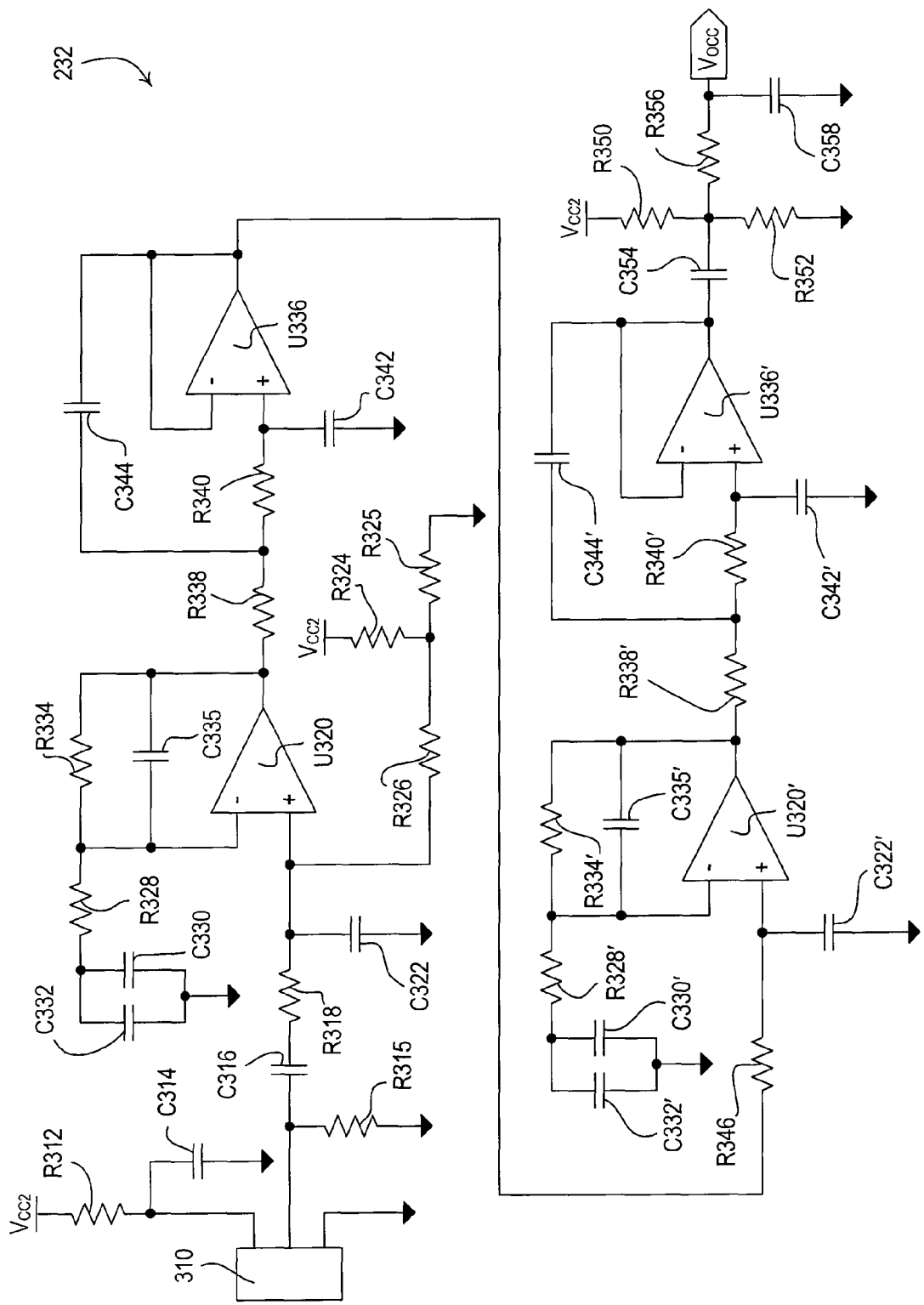
FIG. 3 is a simplified circuit diagram of an occupancy detector circuit of the occupancy sensor of FIG. 2B.

FIG. 3 is a simplified circuit diagram of the occupancy detector circuit 232. The occupancy detector circuit 232 includes the PIR detector 310, which may comprise, for example, part number LHi1128 manufactured by PerkinElmer, Inc. The PIR detector 310 receives power from the second battery V2 via a low-pass filter comprising a resistor R312 and a capacitor C314, which operate to minimize the noise introduced to the occupancy detector circuit 232 from the second battery V2. For example, the resistor R312 may have a resistance of 22Ω, and the capacitor C314 may have a capacitance of 0.01 µF. The PIR detector 310 generates an output signal characterized by a low frequency (e.g., approximately 0.3 Hz to 8 Hz) and representative of the change in infrared energy detected by the PIR detector 310. These changes in infrared energy are typically representative of the occupant moving in the space.

The output of the PIR detector 310 is pulled down towards the second circuit common by a resistor R315 (e.g., having a resistance of 1 MΩ) and is coupled to a four-stage amplifier circuit via a capacitor C316 (e.g., having a capacitance of 1 µF) and a resistor R318 (e.g., having a resistance of 10 kΩ). The first stage of the amplifier circuit comprises an operational amplifier (OP amp) U320 and has a gain of approximately 70. A non-inverting input of the OP amp U320 is coupled to the second circuit common via a capacitor C322 (e.g., having a capacitance of 0.01 µF). Two resistors R324, R325 are connected in series between the second battery voltage $V_{CC2}$ and the second circuit common and both have, for example, resistances of 1 MΩ. The non-inverting input of the OP amp U320 is coupled to the junction of the resistors R324, R325 via a resistor R326 (e.g., having a resistance of 1 MΩ). The series-combination of a resistor R328 (e.g., having a resistance of 14.3 kΩ) and a capacitor C330 (e.g., having a capacitance of 100 µF) is coupled between the inverting input of the OP amp U320 and the second circuit common. A capacitor C332 is coupled in parallel with the capacitor C330 and has, for example, a capacitance of 0.1 µF. The parallel-combination of a resistor R334 and a capacitor C335 is coupled between the inverting input and the output of the OP amp U320.

The output of the OP amp U320 is coupled to the non-inverting input of a second OP amp U336 via two resistors R338, R340 (e.g., having resistances of 118 kΩ and 845 kΩ, respectively). The inverting input of the second OP amp U336 is coupled to the output of the OP amp, such that the second OP amp operates as a buffer (i.e., forming the second stage of the amplifier circuit). The non-inverting input is coupled to the second circuit common through a capacitor C342 (e.g., having a capacitance of 0.01 µF). The junction of the two resistors R338, R340 is coupled to the output of the OP amp U336 via a capacitor C344 (e.g., having a capacitance of 0.047 µF).

The third and fourth stages of the amplifier circuit of the occupancy detector circuit 232 are similar to the first and second stages, respectively. The third stage comprises a third OP amp U320' and also has a gain of approximately 70. The output of the second OP amp U336 is connected to the non-inverting input of the third OP amp U320' via a resistor R346 (e.g., having a resistance of 1 MΩ).

The fourth stage comprises a fourth OP amp U336', which also operates as a buffer. Thus, the total gain of the occupancy detector circuit 232 is approximately 4900. The output of the fourth OP amp U336' is used to generate the occupancy control signal $V_{OCC}$, which is provided to an occupancy control signal input (e.g., an analog input) of the controller 230. Two resistors R350, R352 are connected in series between the second battery voltage $V_{CC2}$ and the second circuit common and both have, for example, resistances of 1 MΩ. A capacitor C354 is coupled between the output of the fourth OP amp U320' and the junction of the two resistors R350, R352, and has, for example, a capacitance of 1 µF. A resistor R356 is coupled between the junction of the two resistors R350, R352 and the occupancy control signal input of the controller 230 and has, for example, a resistance of 1 MΩ. The occupancy control signal input of the controller 230 is coupled to the second circuit common through a capacitor C358 (e.g., having a capacitance of 0.01 µF). The controller 230 converts the occupancy control signal $V_{OCC}$ to a digital signal using, for example, an internal analog-to-digital converter (ADC). As previously mentioned, the occupancy detector circuit 232 draws a current having a magnitude of approximately 7 µA or less from the second battery V2.

Figure 4A:
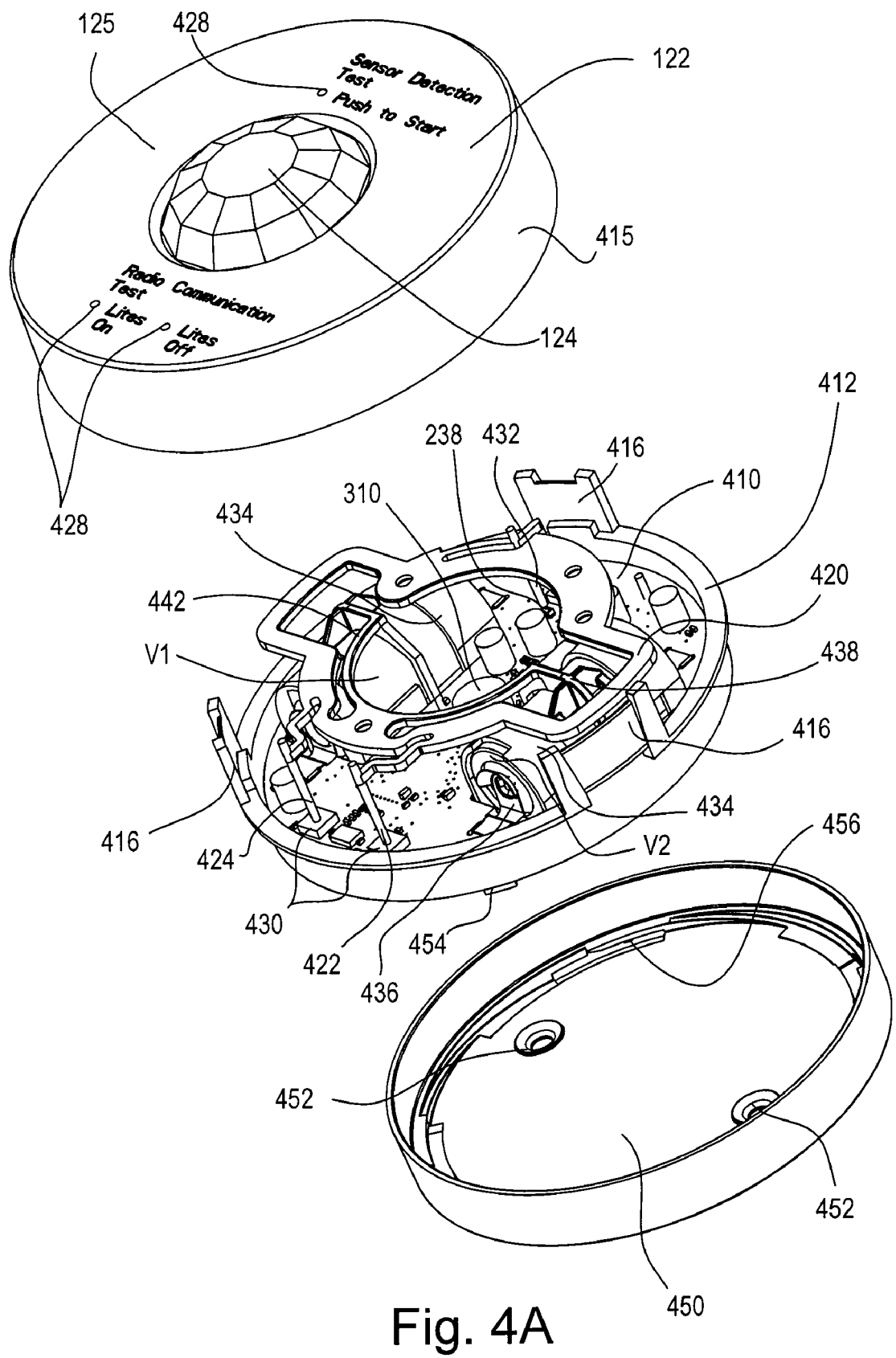
FIG. 4A is a front exploded perspective view of the occupancy sensor of FIG. 2B.
Figure 4B:
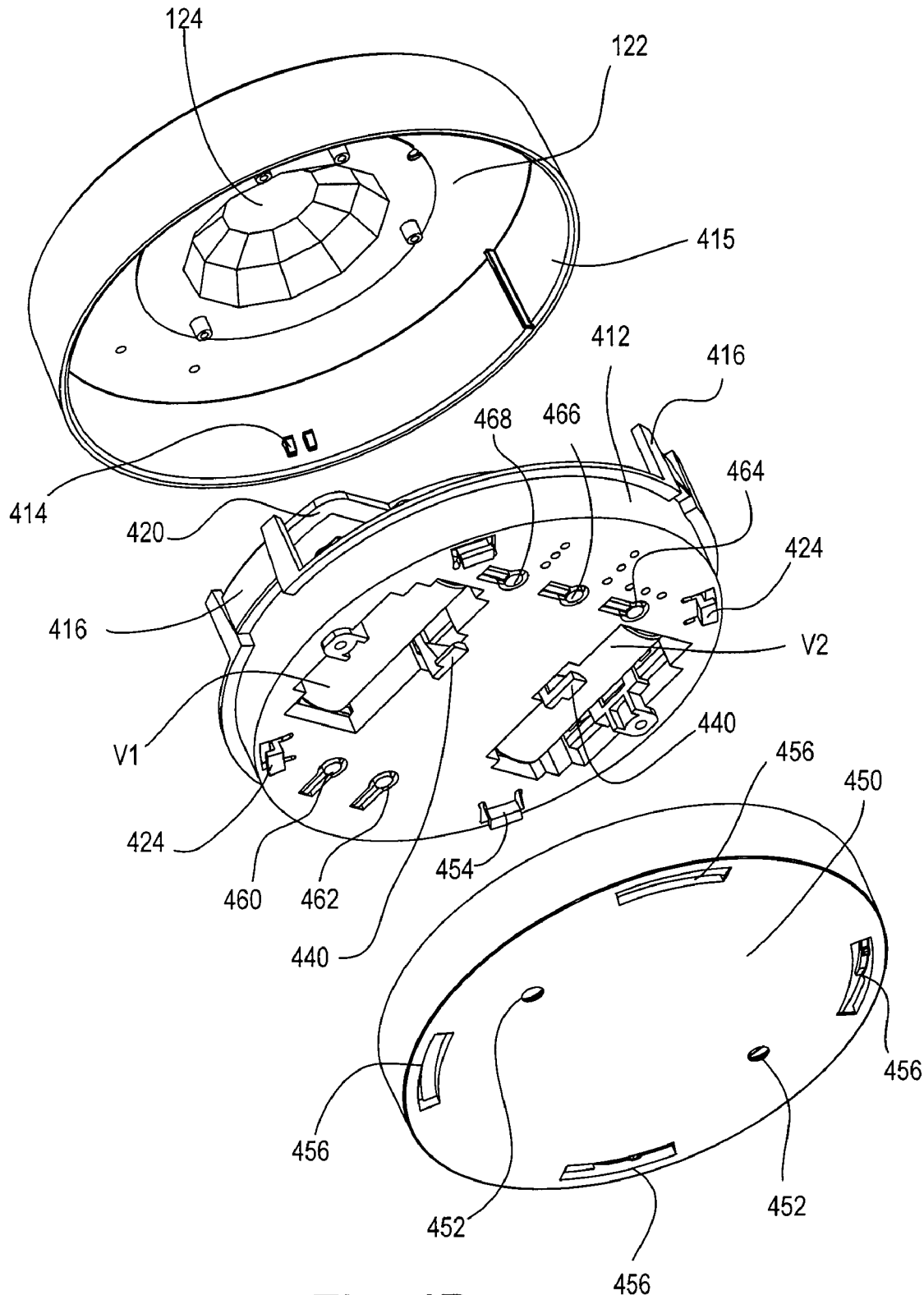
FIG. 4B is a rear exploded perspective view of the occupancy sensor of FIG. 2B.

FIG. 4A is a front exploded perspective view and FIG. 4B is a rear exploded perspective view of one of the occupancy sensors 120. The occupancy sensor 120 comprises a base portion 412 and a flat, circular mounting plate 450 (i.e., a bottom plate), which is releasably attached to the base portion. The enclosure 122 comprises an integral cylindrical wall 415 extending from the periphery of the front surface 125, such that the wall forms a shallow, plastic cup and defines a generally, flat disk-shaped volume. The mounting plate 450 is disposed in a plane parallel to the plate of the front surface 125 of the enclosure 122 and has a diameter less than the diameter of the front surface. The front surface 125 of the enclosure 122 has a diameter greater than about 3 inches and the occupancy sensor 120 has a height from the front surface to the mounting plate 450 of less than about 1.5 inches.

The circuitry of the occupancy sensor 120 is mounted to a printed circuit board (PCB) 410, which is connected to the base portion 412. The base portion 412 is adapted to be connected to the housing 122 via a plurality of tabs 414 received by snaps 416 of the base portion. The PIR detector 310 is mounted to the center of the PCB 410 and is aligned with the lens 124. When the base portion 412 is coupled to the housing 122, the lens 124 is operable to direct the infrared energy from the space towards the PIR detector 310.

Figure 4C:
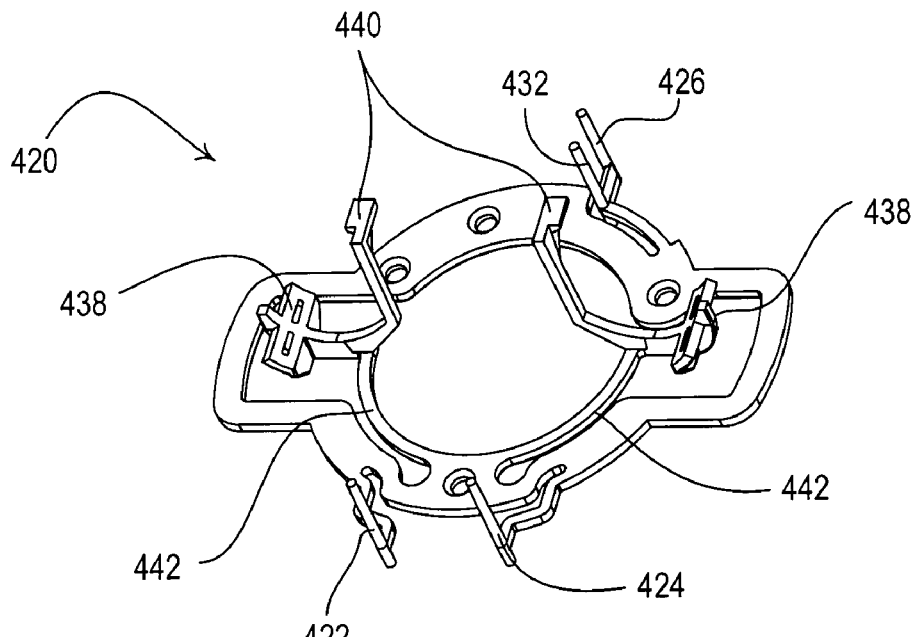
FIG. 4C is a perspective view of a multi-functional structure of the occupancy sensor of FIG. 2B.

The occupancy sensor 120 further comprises a multi-functional structure 420, which is located between the housing 122 and base portion 412. FIG. 4C is a perspective view of the multi-functional structure 420. The multi-functional structure 420 comprises actuation posts 422, 424, 426, which protrude through openings 428 in the front surface 125 of the occupancy sensor 120 to allow for actuation of tactile switches 430 on the PCB 410 from the front surface. The actuation posts 422, 424, 426 comprise a portion of the plurality of actuators 236 of the occupancy sensor 120 and are used during configuration of the lighting control system 100 to verify the operation of the occupancy sensor and the lighting control system. The multi-functional structure 420 also comprises a light pipe 432 positioned parallel to the third actuation post 426 for conducting light from one of the visual indicators 238 (i.e., one of the LEDs) mounted on the PCB 410 to the front surface 125 of the occupancy sensor 120.

Figure 4D:
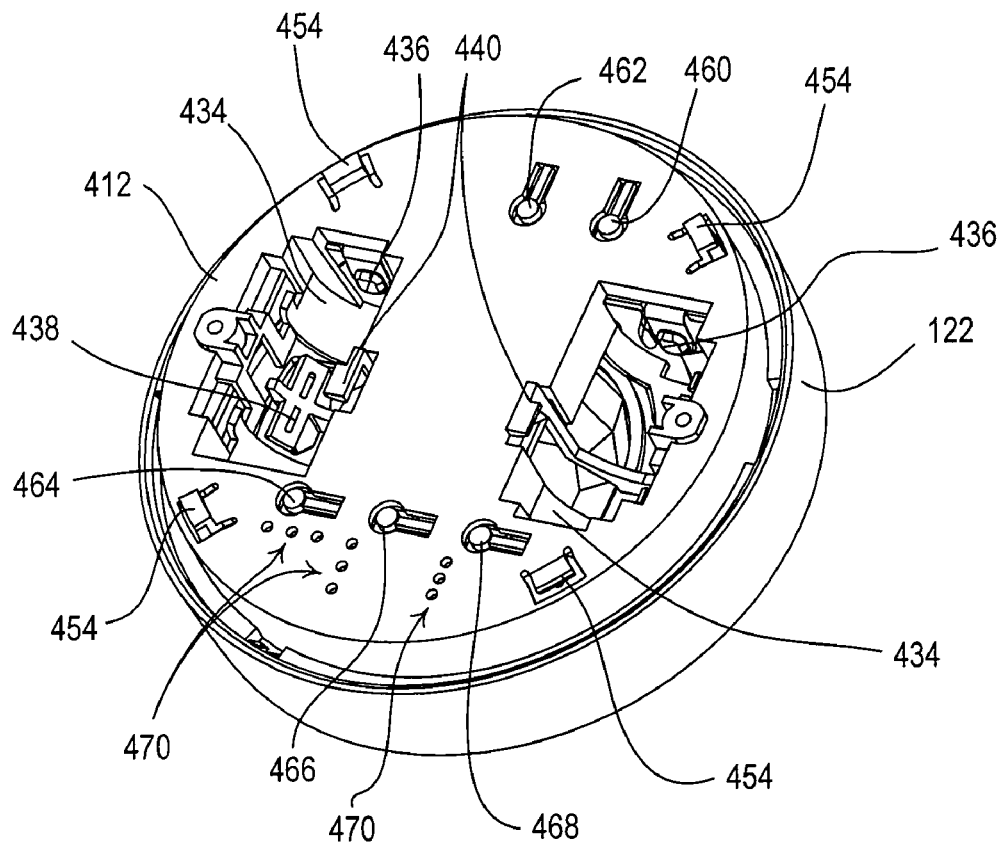
FIG. 4D is a rear perspective view of a base portion of the occupancy sensor of FIG. 2B with batteries removed.

The batteries V1, V2 are housed in battery compartments 434 of the base portion 412. FIG. 4D is a rear perspective view of the base portion with the batteries V1, V2 removed. When installed in the battery compartments 434, the batteries V1, V2 are electrically connected to the circuitry of the occupancy sensor 120 via electrical contacts 436 and are supported by battery supports 438 of the multi-functional structure 420. The multi-functional structure 420 further comprises battery-removal tabs 440 that aid in removing the batteries V1, V2 from the battery compartments 434. When the tabs 440 are pulled away from the base portion 412, flexible arms 442 of the multi-functional structure 420 flex, such that the battery supports 438 force the batteries V1, V2 out of the battery compartments 434.

As shown in FIGS. 4A and 4B, the mounting plate 450 forms a circular disk and allows the occupancy sensor 120 to be mounted to a ceiling or wall. The mounting plate 450 is first attached to the ceiling or wall via screws (not shown) received through attachment openings 452 of the mounting plate 450 and into anchors (not shown) in the ceiling or wall. The base portion 412 (along with the housing 122) is then rotated clockwise around the perimeter of the mounting plate 450, such that flanges 454 of the base portion 412 are received by attachment slots 456 of the support plate. The mounting plate 450 permits the mounting of the occupancy sensor 120 to selected positions within the space to produce optimal operation of the occupancy sensor.

The remainder of the plurality of actuators 236 of the occupancy sensor 120 are provided on the rear surface of the base portion 412 (as shown in FIGS. 4B and 4D) and comprise an assign button 460, an unassign button 462, an occupancy detection criteria (ODC) button 464, an ambient light threshold (ALT) button 466, and an occupancy sensor timeout period (OSTP) button 468. Each of the buttons 460, 462, 464, 466, 468 is formed as an integral part of the base portion 412 and comprises an actuation knob at the end of a flexible arm provided in an elongated U-shaped slot. The actuation knob of each button 460, 462, 464, 466, 468 may be depressed, thus flexing the flexible arm of the button, such that the actuation knob actuates a tactile switch (not shown) mounted to the bottom side of the PCB 410.

During configuration of the lighting control system 100, the user may simultaneously press and hold the toggle button 114 of the dimmer switch 110 and the assign button 460 of one of the occupancy sensors 120 to link the dimmer switch and the one of the occupancy sensors. The user may also simultaneously press and hold the toggle button 114 of the dimmer switch 110 and the unassign button 462 of the occupancy sensor 120 to unassign the occupancy sensor from the dimmer switch. The lighting control system 100 may comprise a plurality of occupancy sensors 120 that may all be assigned to one dimmer switch 110, such that the dimmer switch is responsive to each of the occupancy sensors. The user simply needs to repeat the assignment procedure for each of the plurality of occupancy sensors 120.

The occupancy detection criteria button 464, the ambient light threshold button 466, and the occupancy sensor timeout period button 468 allow for adjustment of various characteristics of the occupancy sensor 120. Consecutive actuations of the occupancy detection criteria button 464 cause the controller 230 to adjust an occupancy detection criteria, used to determine whether the space is occupied, between a number of values, i.e., settings (e.g., three values). For example, actuations of the occupancy detection criteria button 464 may cause the controller 230 to adjust the predetermined occupancy voltage threshold to which the magnitude of the occupancy control signal $V_{OCC}$ is compared between a minimum value, a middle value, and a maximum value. Alternatively, actuations of the occupancy detection criteria button 464 may cause the controller 230 to adjust a gain applied to the occupancy control signal $V_{OCC}$ before the magnitude of the occupancy control signal $V_{OCC}$ is compared to the occupancy voltage threshold. Similarly, the ambient light threshold button 466 and the occupancy sensor timeout period button 468 allow the user to adjust the values of the ambient light threshold and the occupancy sensor timeout period $T_{TIMEOUT}$, respectively. A portion of the visual indicators 238 are mounted to the bottom side of the PCB 410 and shine through openings 470 in the base portion 412. The visual indicators 238 mounted to the bottom side of the PCB 410 are illuminated by the controller 230 to distinguish which of the values of the occupancy detection criteria, the ambient light threshold and the occupancy sensor timeout period $T_{TIMEOUT}$ are selected.

Figure 5:
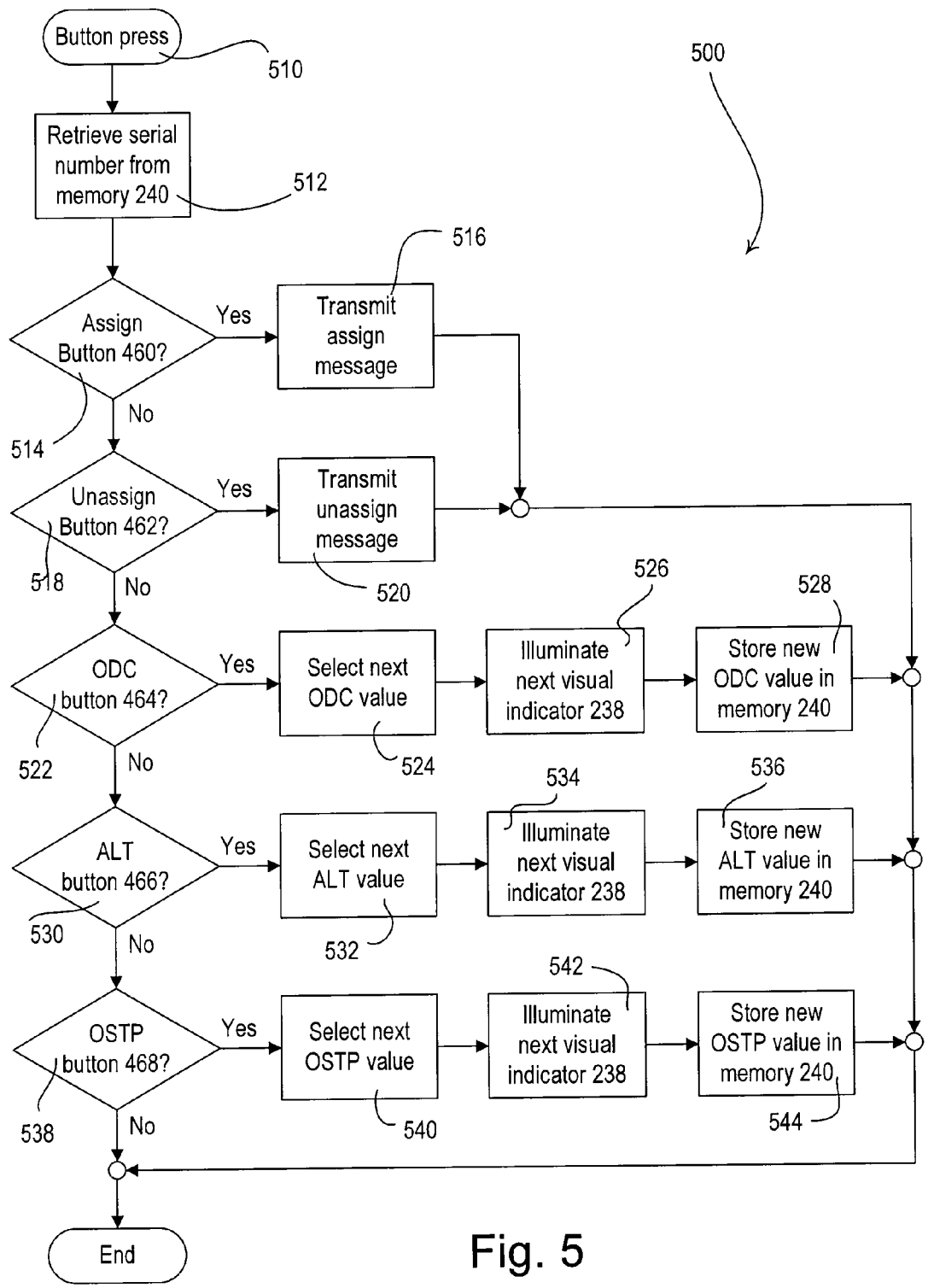
FIG. 5 is a flowchart of a rear actuator procedure executed by a controller of the occupancy sensor of FIG. 2B when an actuator on a rear surface of the base portion of FIG. 4D is pressed.

FIG. 5 is a flowchart of a rear actuator procedure 500 executed by the controller 230 of each occupancy sensor 120 when one of the actuators 460, 462, 464, 466, 486 on the rear surface of the base portion 412 is pressed at step 510. First, the serial number of the occupancy sensor 120 is retrieved from the memory 240 at step 512, such that the serial number can be transmitted in a digital message to the dimmer switch 110. If the assign button 460 is pressed at step 514, an assign message (including the serial number) is transmitted to the dimmer switch 110 at step 516 and the rear actuator procedure 500 exits. Similarly, if the unassign button 462 is pressed at step 518, an unassign message (including the serial number) is transmitted to the dimmer switch 110 at step 520, before the rear actuator procedure 500 exits.

If neither the assign button 460 nor the unassign button 462 is being pressed at steps 514 and 518, the controller 230 determines whether the occupancy detection criteria button 464, the ambient light threshold button 466, or the occupancy sensor timeout period button 468 is being pressed. Specifically, if the occupancy detection criteria button 464 is pressed at step 522, the controller 230 selects the next of the three selectable values for the occupancy detection criteria at step 524. At step 526, the controller 230 illuminates the next of the three visual indicators 238 (that are linearly arranged next to the occupancy detection criteria button 464 as shown in FIG. 4D). The controller 230 then stores the new value of the occupancy detection criteria in the memory 240 at step 528. If the ambient light threshold button 466 is pressed at step 530, the controller 230 selects the next value for the ambient light threshold at step 532, illuminates the next of the visual indicators 238 at step 534, and stores the new ambient light threshold value in the memory 240 at step 536. If the occupancy sensor timeout period button 468 is pressed at step 538, the controller 230 selects the next value for the occupancy sensor timeout period $T_{TIMEOUT}$ at step 540, illuminates the next of the visual indicators 238 at step 542, and stores the new value of the occupancy sensor timeout period $T_{TIMEOUT}$ in the memory 240 at step 544.

Figure 6A:
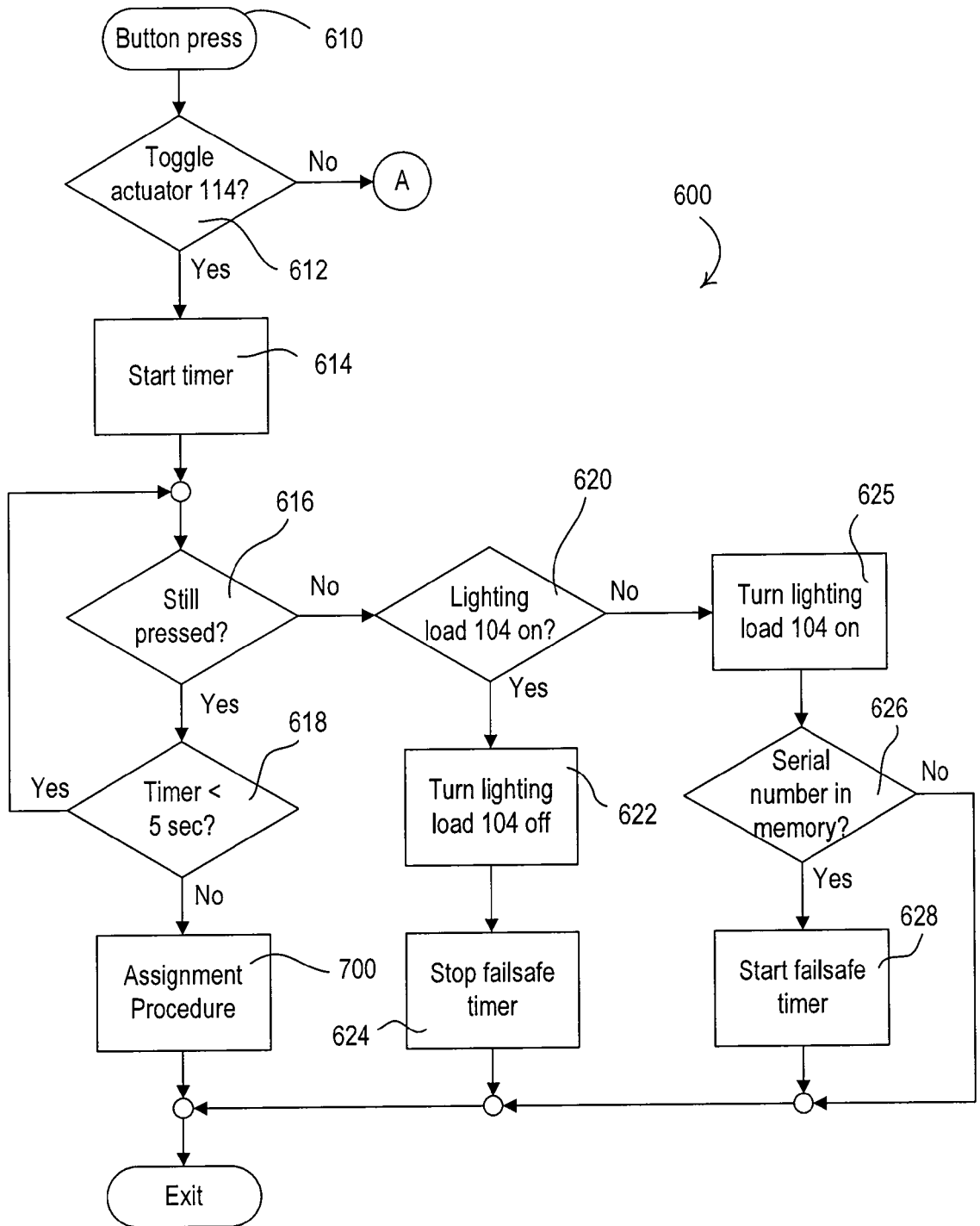
FIGS. 6A and 6B is a simplified flowchart of a dimmer actuator procedure executed by a controller of the dimmer switch of FIG. 2A.
Figure 6B:
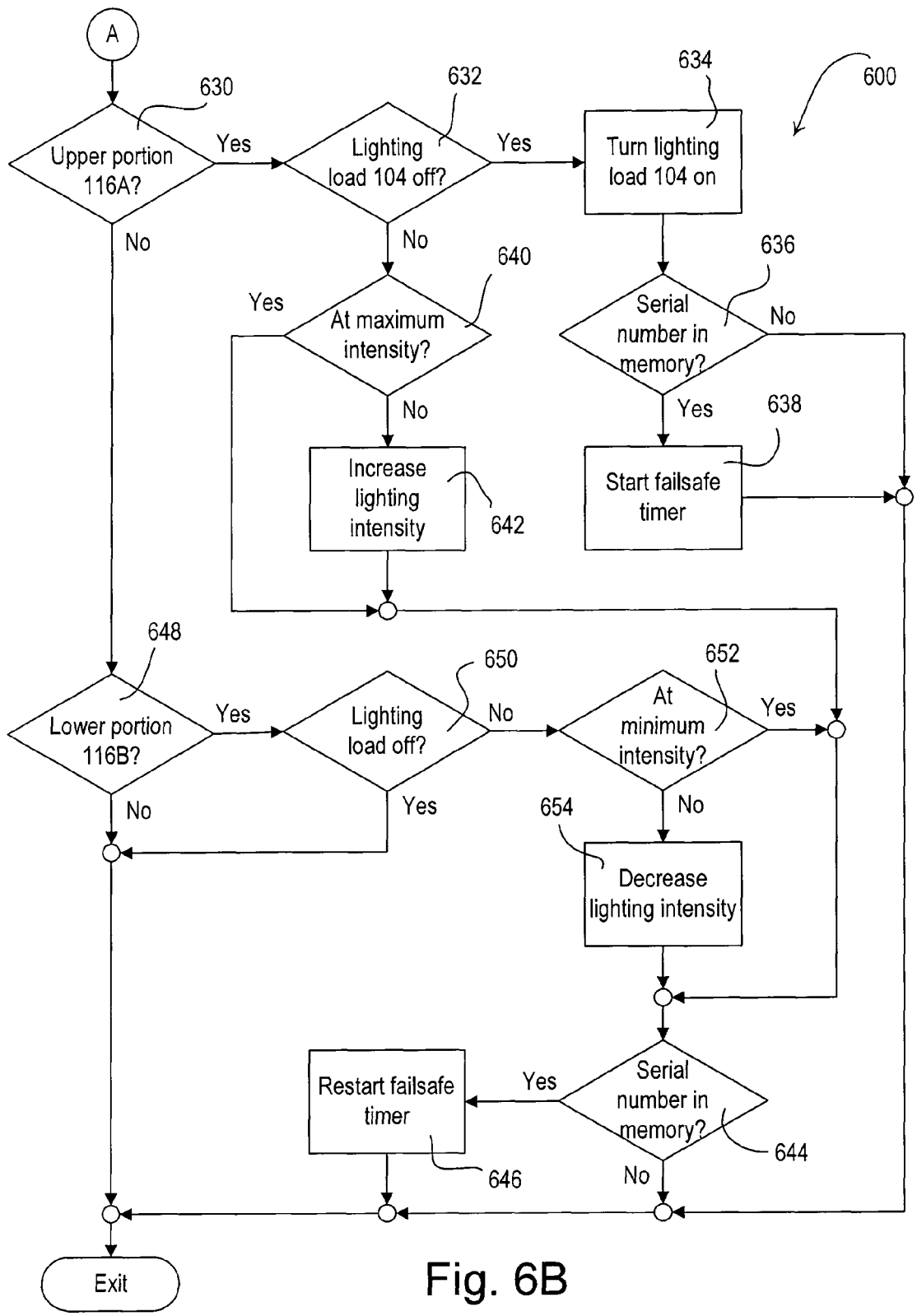

FIGS. 6A and 6B are simplified flowcharts of a dimmer actuator procedure 600 executed by the controller 214 of the dimmer switch 110 in response to an actuation of the toggle actuator 114 or the intensity adjustment actuator 116 at step 610. If the toggle actuator 114 is actuated at step 612, the controller 214 initializes a button timer to zero seconds and starts the button timer increasing with respect to time at step 614. The button timer is used to determine how long the toggle actuator 114 is pressed. If the toggle actuator 114 is still being pressed at step 616, a determination is made as to whether the button timer is less than a predetermined button hold time, e.g., five (5) seconds, at step 618. The dimmer actuator procedure 600 loops until either the toggle actuator 114 is released at step 616 or the button timer has exceeded the predetermined button hold time at step 618. If the toggle button 114 is still pressed at step 616 and the button timer is greater than the predetermined button hold time at step 618, the controller 214 executes an assignment procedure 700, which will be described in greater detail below with reference to FIG. 7.

During the assignment procedure 700, the dimmer switch 110 may be assigned to one or more occupancy sensors 120. Specifically, the controller 214 is operable to store the serial numbers of the assigned occupancy sensors 120 in the memory 216. Thereafter, the controller 214 is responsive to digital messages received from the assigned occupancy sensors 120. If the dimmer switch 110 is assigned to at least one occupancy sensor 120, the controller 214 starts the failsafe timer whenever the lighting load 104 is toggled from off to on.

Referring back to FIG. 6A, if the toggle actuator 114 is released at step 616 while the button timer is less than the predetermined button hold time at step 618, the controller 214 controls the lighting load 104 appropriately. Specifically, if the lighting load 104 is on at step 620, the controller 214 turns the lighting load off at step 622 and stops the failsafe timer at step 624, before the dimmer actuator procedure 600 exits. If the lighting load 104 is off at step 620, the controller 214 turns the lighting load on at step 625. If there is a serial number of one of the occupancy sensors 120 stored in the memory 216 at step 626, the controller 214 starts the failsafe timer at step 628 and the dimmer actuator procedure 600 exits.

Referring to FIG. 6B, if the toggle actuator 114 is not pressed at step 612, but the upper portion 116A of the intensity adjustment actuator 116 is pressed at step 630, a determination is made as to whether the lighting load 104 is off at step 632. If the lighting load 104 is off at step 632, the controller 214 turns the lighting load on to the minimum intensity at step 634. If there is a serial number of an occupancy sensor 120 stored in the memory 216 at step 636, the controller 214 starts the failsafe timer at step 638 and the dimmer actuator procedure 600 exits. If the lighting load 104 is on at step 632 and the dimmer switch 110 is not at the maximum intensity at step 640, the controller 214 increases the lighting intensity of the lighting load 104 by a predetermined increment at step 642. If the dimmer switch 110 is at the maximum intensity at step 640, the controller 214 does not adjust the lighting intensity. If there is a serial number of an occupancy sensor 120 stored in the memory 216 at step 644, the controller 214 restarts the failsafe timer at step 646 and the dimmer actuator procedure 600 exits.

If the lower portion 116B of the intensity adjustment actuator 116 is pressed at step 648 and the lighting load 104 is off at step 650, the dimmer actuator procedure 600 exits. If the lighting load 104 is on at step 650 and the dimmer switch 110 is not at the minimum intensity at step 652, the controller 214 decreases the lighting intensity by a predetermined increment at step 654. If the dimmer switch 110 is at the minimum intensity at step 652, the controller 214 does not turn off the lighting load 104. If there is a serial number of an occupancy sensor 120 stored in the memory 216 at step 644, the controller 214 restarts the failsafe timer at step 646 and the dimmer actuator procedure 600 exits.

Figure 7:
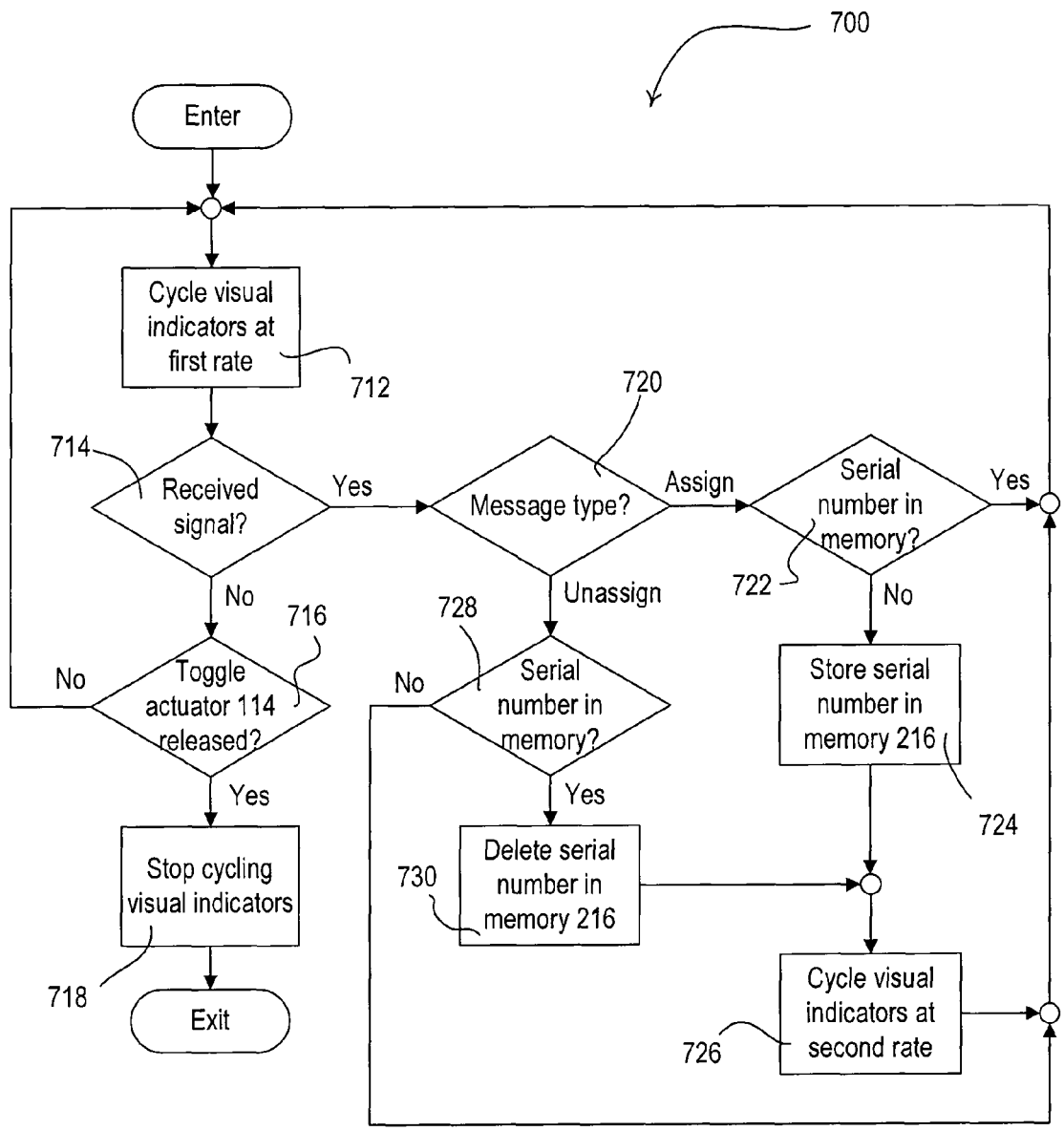
FIG. 7 is a simplified flowchart of an assignment procedure executed by the controller of the dimmer switch of FIG. 2A.

FIG. 7 is a simplified flowchart of the assignment procedure 700 executed by the controller 214 of the dimmer switch 110 if the toggle actuator 114 is pressed and held for greater than the predetermined button hold time at step 618 of the dimmer actuator procedure 600. The assignment procedure 700 is executed as long at the toggle actuator 114 is held. At step 712, the controller 214 first begins to cycle the visual indicators 118, such that the visual indicators are consecutively turned on and off at a first rate. Next, the controller 214 determines if an assign message or an unassign message has been received from an occupancy sensor 120 at step 714. The assignment procedure 700 loops until either the toggle actuator 114 is released at step 716 or either an assign message or an unassign message is received at step 714. If the toggle actuator 114 is no longer being held at step 716, the controller 214 stops cycling the visual indicators 118 at step 718 and the assignment procedure 700 exits.

When an assign message or an unassign message is received at step 714 while the toggle actuator 114 is still held, the controller 214 either stores the serial number of the received message in the memory 216 or deletes the serial number from the memory. Specifically, if the received message is an assign message at step 720, and the serial number from the received message is not already stored in the memory 216 at step 722, the controller 214 stores the serial number in the memory at step 724. The controller 214 then temporarily cycles the visual indicators 118 at a second rate (faster than the first rate) at step 726. The assignment procedure 700 then loops around such that another occupancy sensor 120 may be assigned to the dimmer switch 110. If the received message is an unassign message at step 720, and the serial number from the received message is stored in the memory 216 at step 728, the controller 214 deletes the serial number from the memory at step 730 and temporarily cycles the visual indicators 118 at the second rate at step 726.

Figure 8:
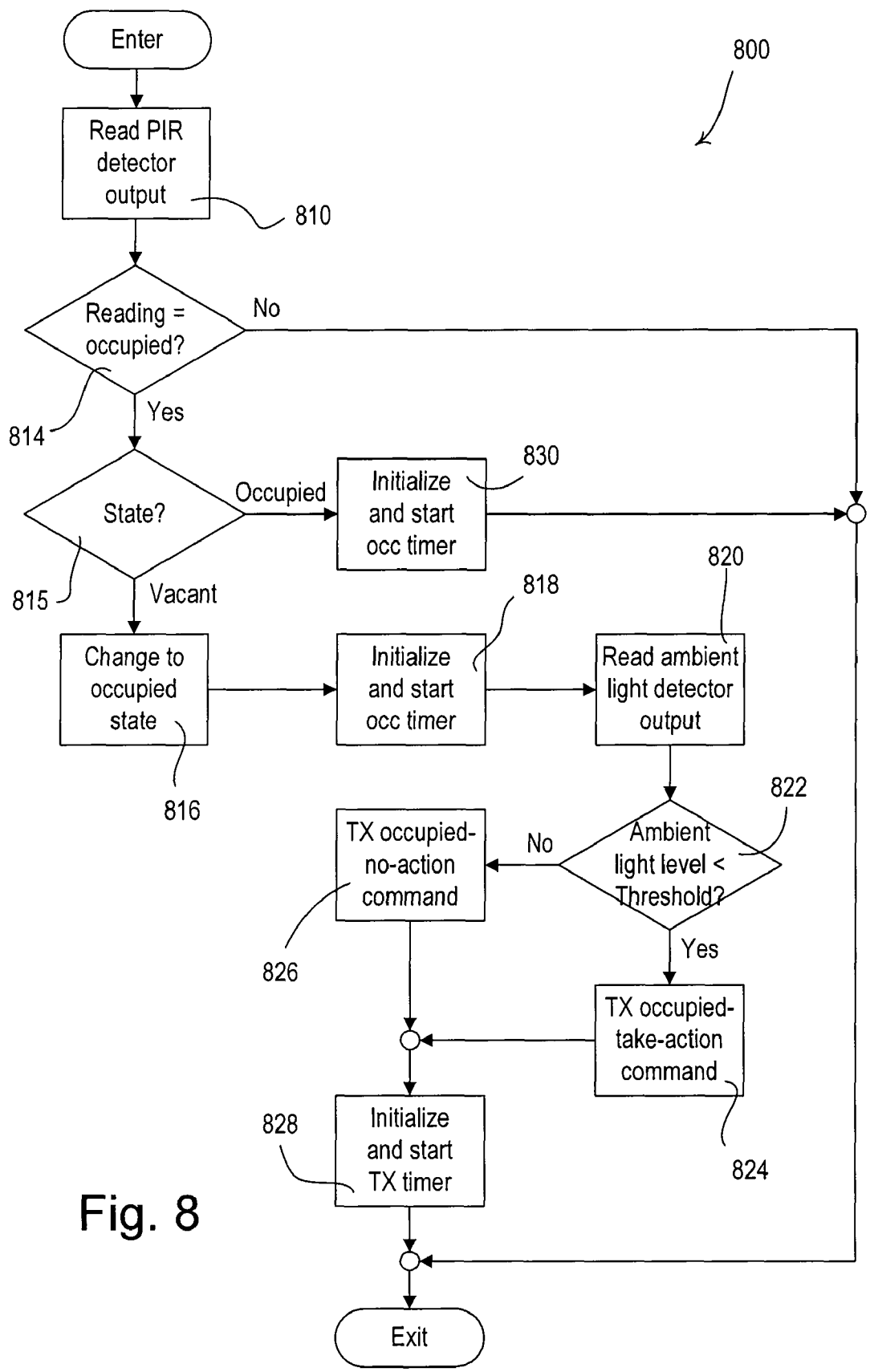
FIG. 8 is a flowchart of an occupancy detection procedure executed periodically by the controller of the occupancy sensor of FIG. 2B according to the first embodiment of the present invention.

FIG. 8 is a flowchart of an occupancy detection procedure 800 executed periodically, e.g., every 50 msec, by the controller 230 of each occupancy sensor 120. As previously, the controller 230 uses the occupancy timer to provide some delay in the adjustment of the state of the occupancy sensor. Whenever the controller 230 obtains a detector reading that signifies an occupancy condition, the controller initializes the occupancy timer to the predetermined occupancy sensor timeout period $T_{TIMEOUT}$ and starts the occupancy timer counting down. Therefore, the occupancy sensor 120 stays in the occupied state as long as the controller 230 receives indications of the occupancy condition from the PIR detector before the occupancy timer expires. However, when the occupancy timer expires, the controller 230 changes to the vacant state as will be described in greater detail below. The controller 230 also uses a transmission timer (or "TX" timer) to keep track of when to transmit the next occupied-no-action command while in the occupied state.

Referring to FIG. 8, the controller 230 first reads the output of the PIR detector circuit 232 at step 810, for example, by sampling the occupancy control signal $V_{OCC}$. The controller 230 then determines if the detector reading signifies an occupancy condition in the space, for example, by comparing the magnitude of the output voltage of the PIR detector to the predetermined occupancy voltage threshold. If the detector reading does not signify an occupancy condition in the space at step 814, the occupancy detection procedure 800 simply exits. However, if the detector reading signifies an occupancy condition at step 814 and the occupancy sensor 120 is presently in the vacant state at step 815, the controller 230 changes to the occupied state at step 816. At step 818, the controller 230 initializes the occupancy timer to the predetermined occupancy sensor timeout period $T_{TIMEOUT}$ and starts the occupancy timer (such that the occupancy timer decreases in value with time). Then, the controller 230 reads the output of the ambient light detector 234 at step 820. If the value of the ambient light level is less than the predetermined ambient light level threshold at step 822, the controller 230 transmits (TX) the occupied-take-action command at step 824. Otherwise, the controller 230 transmits the occupied-no-action command at step 826. After transmitting either of the digital messages at step 824 and 826, the controller 230 initializes and starts the transmission timer counting down at step 828 before the occupancy detection procedure 800 exits.

When the occupancy detection procedure 800 is executed and the state of the occupancy sensor 120 is occupied at step 815, the controller 230 simply initializes and starts the occupancy timer at step 830 before the occupancy detection procedure 800 exits.

Figure 9:
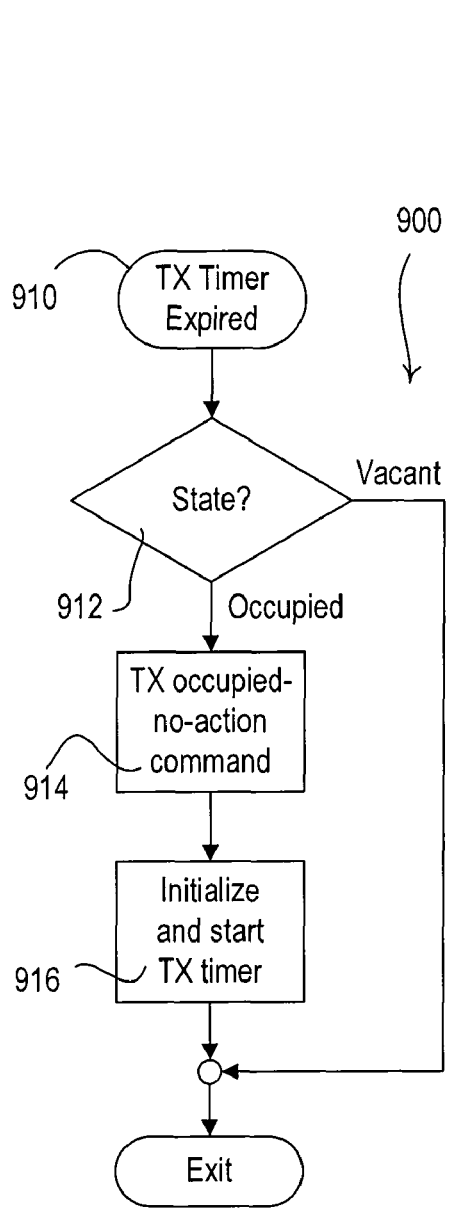
FIG. 9 is a flowchart of a transmission timer procedure executed by the controller of the occupancy sensor of FIG. 2B according to the first embodiment of the present invention.

FIG. 9 is a flowchart of a transmission timer procedure 900 executed by the controller 230 of each occupancy sensor 120 when the transmission timer expires at step 910 to allow the occupancy sensor to regularly transmit the occupied-no-action commands to the dimmer switch 110. If the occupancy sensor 120 is in the occupied state at step 912, the controller 230 transmits the occupied-no-action command to the dimmer switch 110 at step 914 and restarts the transmission timer at step 916, before the transmission timer procedure 900 exits. If the occupancy sensor 120 is in the vacant state at step 912 when the transmission timer expires at step 910, the controller 230 does not transmit any digital messages and the transmission timer procedure 900 simply exits.

Figure 10:
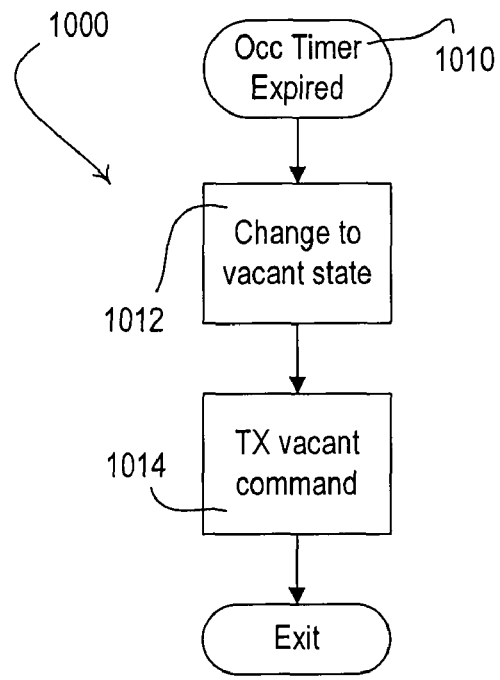
FIG. 10 is a flowchart of an occupancy timer procedure executed by the controller of the occupancy sensor of FIG. 2B according to the first embodiment of the present invention.

FIG. 10 is a flowchart of an occupancy timer procedure 1000 executed by the controller 230 of each occupancy sensor 120 when the occupancy timer expires at step 1010, i.e., when the occupancy sensor has determined that the space is unoccupied. Specifically, the controller 230 changes to the vacant state at step 1012 and transmits the vacant command to the dimmer switch 110 at step 1014 before the occupancy timer procedure 1000 exits.

Figure 11:
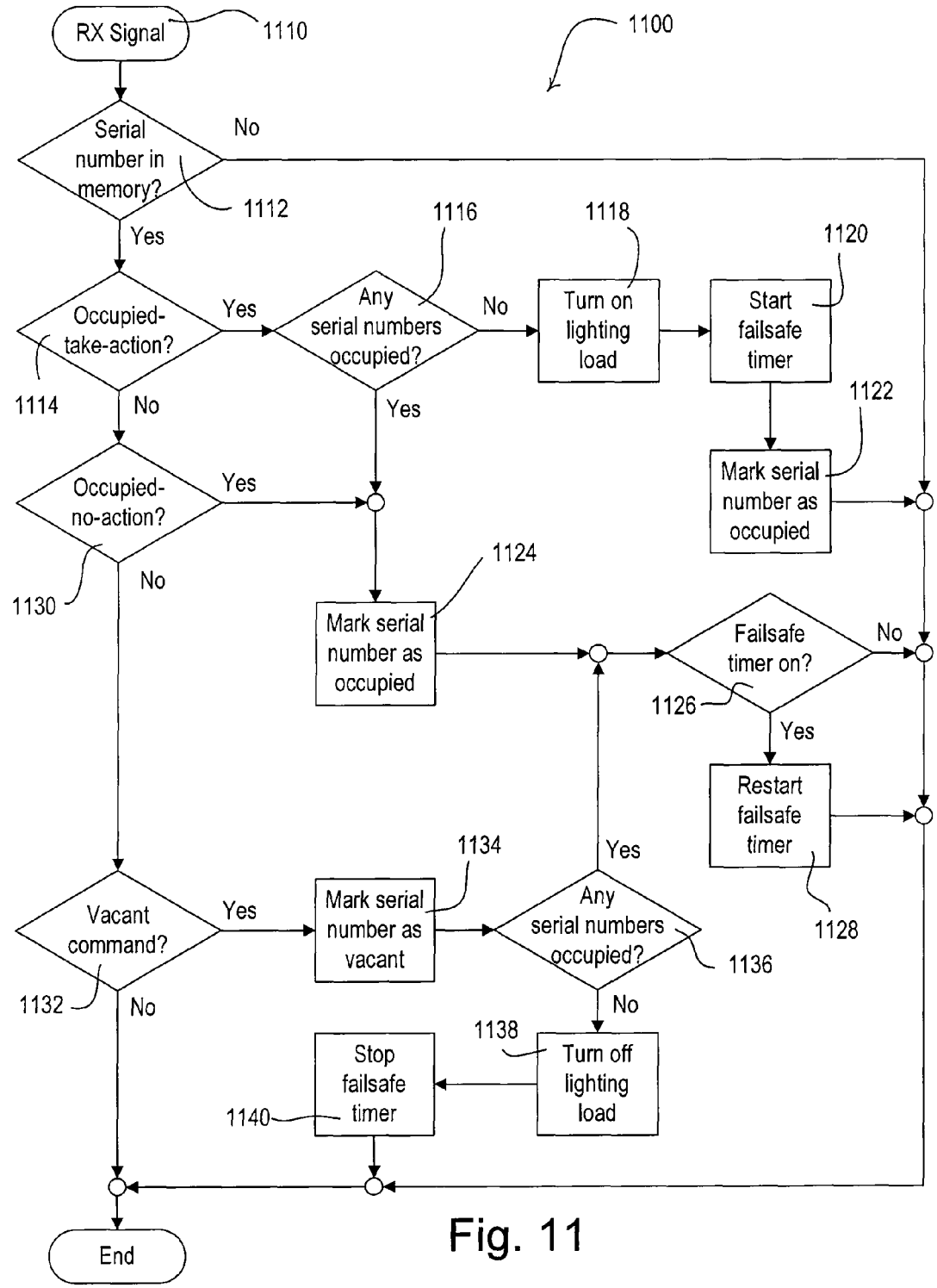
FIG. 11 is a flowchart of a received message procedure executed by the controller of the dimmer switch of FIG. 2A according to the first embodiment of the present invention.

FIG. 11 is a simplified flowchart of a received message procedure 1100 (or "RX" procedure) executed by the controller 214 of the dimmer switch 110 in response to receiving a digital message from one of the occupancy sensors 120 at step 1110. The controller 214 keeps track of the states of the occupancy sensor 120 to which the dimmer switch 110 is assigned in response to the digital messages received from the occupancy sensors. Specifically, if the controller 214 receives an occupied-take-action command or an occupied-no-action command from an occupancy sensor 120, the controller 214 marks the serial number of the occupancy sensor as "occupied" in the memory 216. If the controller 214 receives a vacant message from the occupancy sensor 120, the controller marks the serial number of the occupancy sensor as "vacant" in the memory 216. The controller waits for a vacant command from all of the occupancy sensors to which the dimmer switch 110 is assigned before turning off the lighting load 104. However, if the failsafe timer expires, the controller 214 marks all of the serial numbers stored in the memory 216 as vacant and turns the lighting load 104 off.

Referring to FIG. 11, after receiving the digital message at step 1110, the controller 214 first determines whether the serial number provided in the received digital message is stored in the memory 216 at step 1112. If not, the controller 214 does not process the received digital message and the received message procedure 1100 exits. If the serial number of the received digital message is stored in the memory 216 at step 1112 and the received digital message is an occupied-take-action command at step 1114, the controller 214 determines if any of the serial numbers stored in the memory 216 are marked as occupied at step 1116 to determine if the space is occupied or vacant. If there are no serial numbers marked as occupied at step 1116 (i.e., the space has just become occupied), the controller 214 controls the controllably conductive device 210 to turn on the lighting load 104 at step 1118 and starts the failsafe timer at step 1120. The controller 214 then marks the serial number of the received digital message as occupied at step 1122 and the received message procedure 1100 exits. If there are serial numbers marked as occupied at step 1116 (i.e., the space is occupied), the controller 214 marks the serial number of the received digital message as occupied at step 1124. If the failsafe timer is presently on at step 1126, the controller 214 restarts the failsafe timer at step 1128, before the received message procedure 1100 exits.

If the received digital message is an occupied-no-action command at step 1130, the controller 214 does not adjust the amount of power delivered to the lighting load 104. The controller 214 simply marks the serial number as occupied at step 1124 and restarts the failsafe timer at step 1128 if the failsafe timer is on at step 1126. If the received digital message is a vacant command at step 1132, the controller 214 marks the serial number as vacant at step 1134. If any of the serial numbers are still marked as occupied at step 1136 (i.e., the space is still occupied), the controller 214 restarts the failsafe timer at step 1128 if the failsafe timer is on at step 1126. However, if all of the serial numbers are marked as vacant at step 1136 (i.e., the space is now vacant), the controller 214 controls the lighting load 104 off at step 1138 and stops the failsafe timer at step 1140, before the received message procedure 1100 exits.

Figure 12:
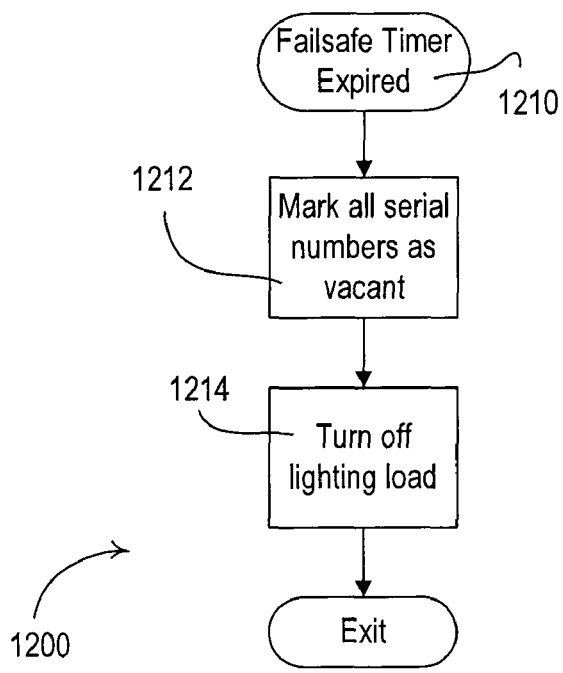
FIG. 12 is a simplified flowchart of a failsafe timer procedure executed by the controller according to the first embodiment of the present invention.

FIG. 12 is a simplified flowchart of a failsafe timer procedure 1200 executed by the controller 214 of the dimmer switch 110 when the failsafe timer expires at step 1210. The controller 214 simply marks all of the serial numbers stored in the memory 216 as vacant at step 1212 and turns off the lighting load 104 at step 1214 before the failsafe timer procedure 1200 exits.

According to a second embodiment of the present invention, the dimmer switch 110 is operable to store in the memory 216 the values of the various operating characteristics of the lighting control system 100, e.g., the occupancy voltage threshold, the ambient light level threshold, and the occupancy sensor timeout period $T_{TIMEOUT}$. The dimmer switch 110 may provide, for example, an advanced programming mode, such that the values of the operating characteristics may be adjusted in response to actuations of the toggle actuator 114 and the intensity adjustment actuator 116. An advanced programming mode is described in greater detail in U.S. Pat. No. 7,190,125, issued Mar. 13, 2007, entitled PRO- GRAMMABLE WALLBOX DIMMER, the entire disclosure of which is hereby incorporated by reference. Since the user does not need to access the occupancy sensors 120 (which may be mounted to a ceiling) to adjust the operating characteristics, the use of the toggle actuator 114 and the intensity adjustment actuator 116 of the dimmer switch 110 allows for easier adjustment of the operating characteristics.

Because the dimmer switch 110 stores the values of the operating characteristics, the occupancy sensors 120 must transmit multiple digital messages to the dimmer switch 110. For example, if the occupancy voltage threshold can be programmed to three different levels, the occupancy sensors 120 must determine occupancy in the space at all three different levels and transmit the results of all three determinations to the dimmer switch 110. The dimmer switch 110 is then able to use the result of the detections that was determined at the occupancy voltage threshold stored in the memory 216 to change between an occupied state and a vacant state and to control the lighting load 104. The dimmer switch 110 maintains an occupancy timer (or "occ" timer), such that the dimmer switch turns off the lighting load 104 after the occupancy timeout period $T_{TIMEOUT}$.

Figure 13:
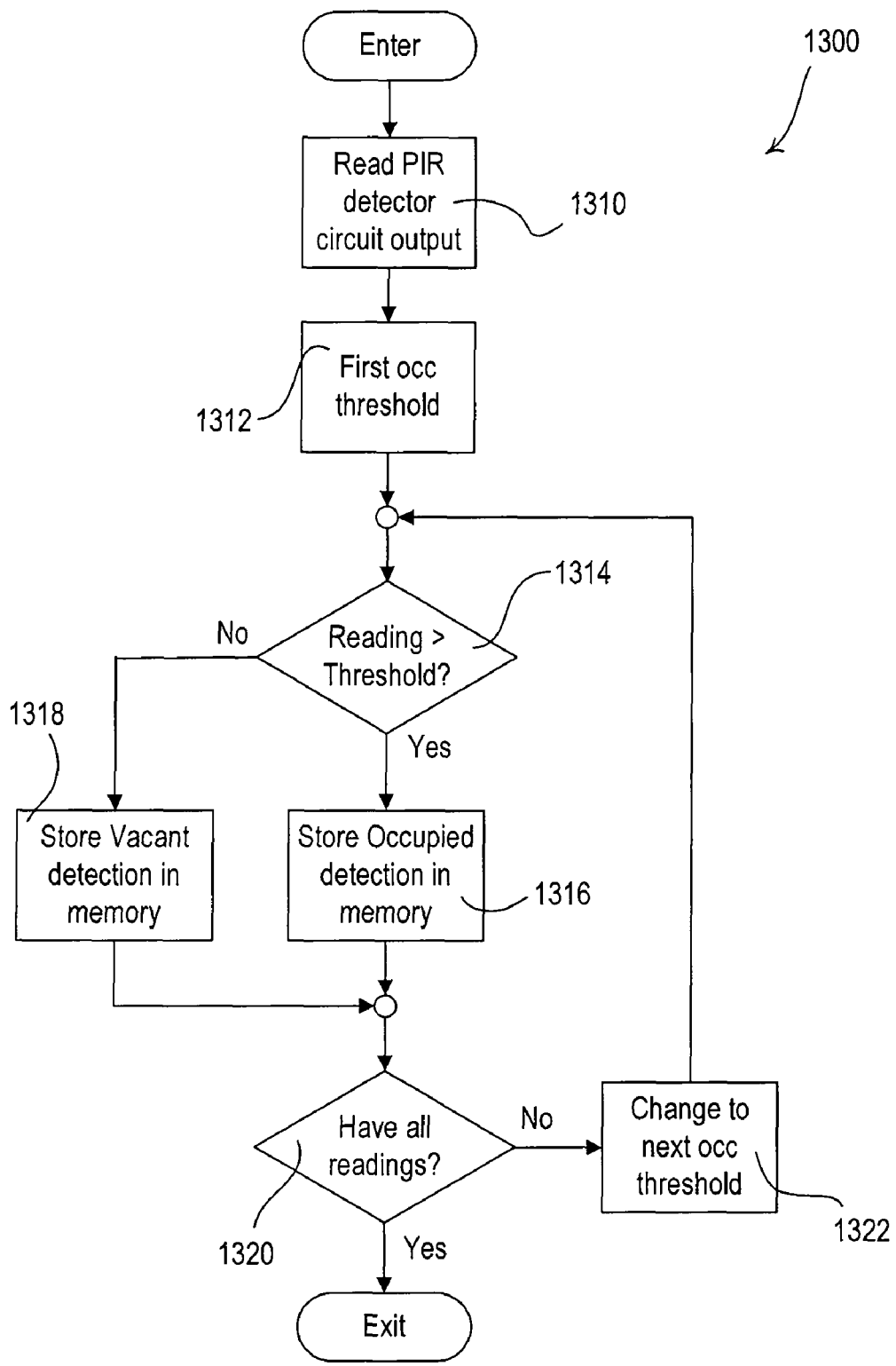
FIG. 13 is a flowchart of an occupancy detection procedure executed periodically by the controller of the occupancy sensor of FIG. 2B according to a second embodiment of the present invention.

FIG. 13 is a simplified flowchart of an occupancy detection procedure 1300 executed periodically, e.g., every 50 msec, by the controller 230 of each occupancy sensor 120 according to the second embodiment of the present invention. The controller 230 begins by sampling the output of the PIR detector circuit 232 at step 1310 and selecting the first occupancy voltage threshold at step 1312. If the sample is greater than the first occupancy voltage threshold at step 1314, the controller 230 stores an occupancy detection for the first occupancy voltage threshold in the memory 240 at step 1316. Otherwise, the controller 230 stores a vacancy detection in the memory 240 at step 1318. If the controller 230 has not determined occupancy at all of the possible values of the occupancy voltage threshold at step 1320, the controller changes to the next occupancy voltage threshold value at step 1322 and compares the reading from step 1310 to that occupancy voltage threshold at step 1314. When the controller 230 has determined occupancy for each of the possible values of the occupancy voltage threshold at step 1320, the occupancy detection procedure 1300 exits.

Figure 14:
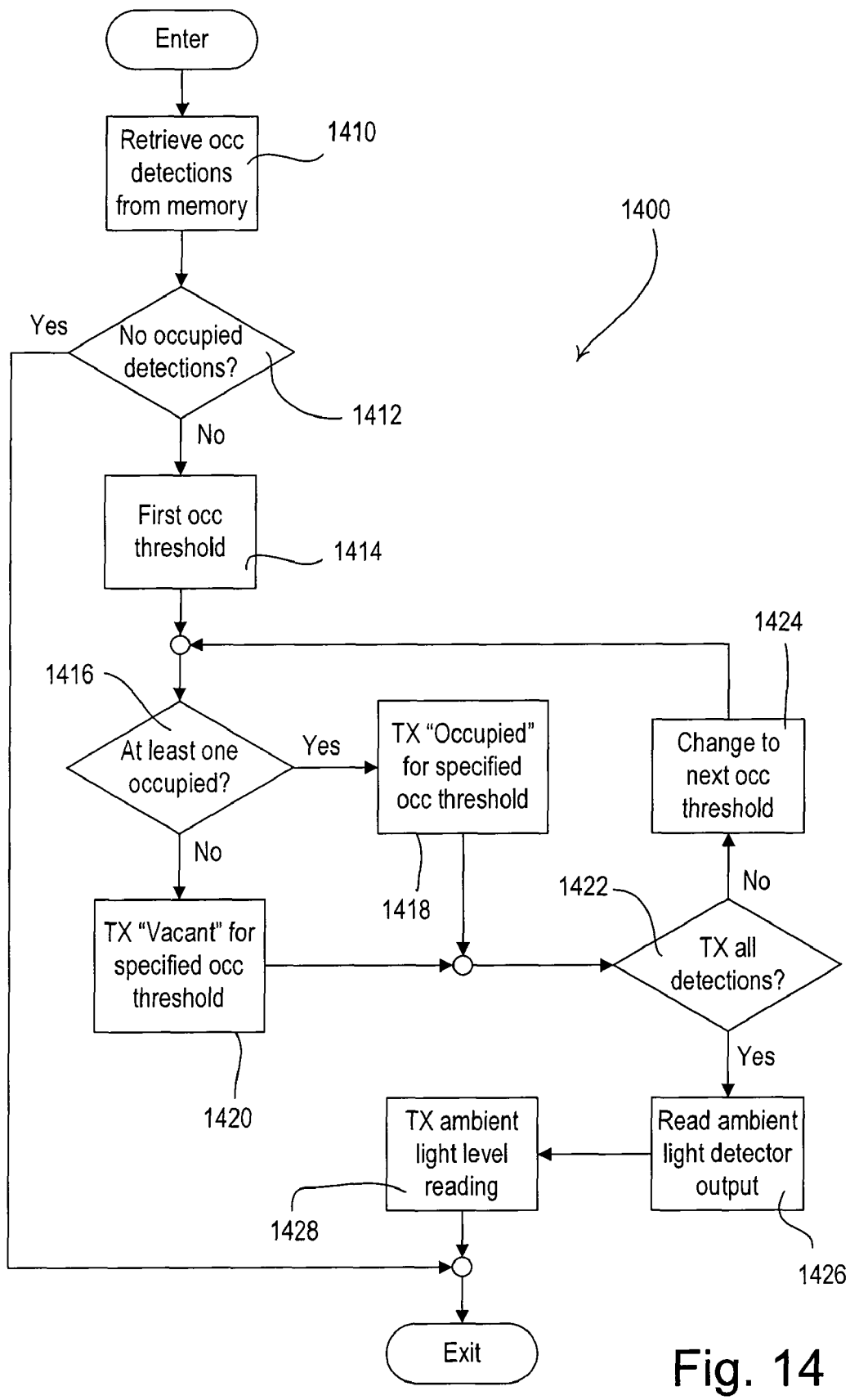
FIG. 14 is a flowchart of a transmission procedure executed by the controller of the occupancy sensor of FIG. 2B according to the second embodiment of the present invention.

FIG. 14 is a simplified flowchart of a transmission procedure 1400 executed periodically, e.g., every one minute, by the controller 230 of each occupancy sensor 120 according to the second embodiment of the present invention. First, the controller 230 retrieves the occupancy and vacancy detections from the memory 240 at step 1410. If there no occupancy detections at step 1412 (i.e., there have not been any occupancy detections in the last minute), the transmission procedure 1400 simply exits. Otherwise, the controller 230 selects the first occupancy voltage threshold at step 1414. If the occupancy sensor 120 has determined at least one occupancy detection since the last execution of the transmission procedure 1400 (i.e., in the last minute) at step 1416, the controller 230 transmits at step 1418 a digital message that indicates an occupancy detection at the first occupancy voltage threshold. If the occupancy sensor 120 did not determine at least one occupancy detection since the last execution of the transmission procedure 1400 at step 1416, the controller 230 transmits at step 1418 a digital message that indicates a Vacant detection at the first occupancy voltage threshold.

If the controller 230 has not transmitted the results of the detections for all of the possible occupancy voltage thresholds at step 1422, the controller selects the next occupancy voltage threshold at step 1424 and determines at step 1416 whether at least one occupancy detection occurred at that occupancy voltage threshold. The controller 230 then either transmits an occupancy detection at step 1418 or a vacancy detection at step 1420 for the present occupancy voltage threshold. When the controller 230 is finished transmitting all of the results of the detections for the possible occupancy voltage thresholds at step 1422, the controller 230 reads the output of the ambient light detector 234 at step 1426 and transmits the ambient light level reading to the dimmer switch 110 at step 1428 before the transmission procedure 1400 exits.

Figure 15:
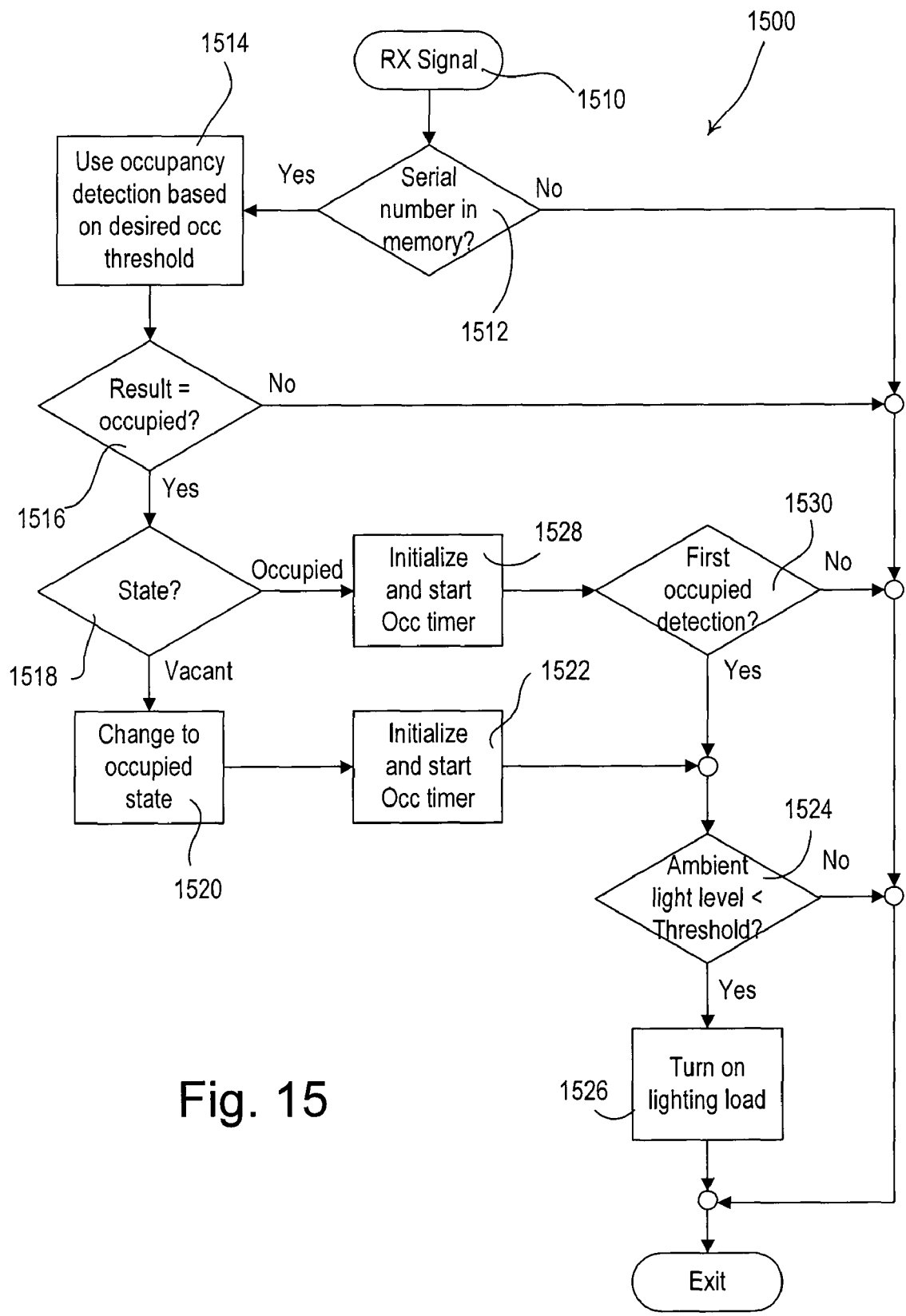
FIG. 15 is a flowchart of a received message procedure executed by the controller of the dimmer switch of FIG. 2A according to the second embodiment of the present invention.

FIG. 15 is a simplified flowchart of a received message procedure 1500 executed by the controller 214 of the dimmer switch 110 in response to receiving a digital message at step 1510. Specifically, the dimmer switch 110 may receive a number of digital messages containing the results of the detections at the various occupancy voltage thresholds and the ambient light level reading. The controller 214 first determines if the serial number of the received digital messages is stored in the memory 216 at step 1512. If not, the received message procedure 1500 simply exits. However, if the serial number is assigned to the dimmer switch 110 at step 1512, the controller 214 chooses at step 1514 to use the result of the detection at the desired occupancy voltage threshold (i.e., as chosen by the user during configuration).

If the result of the detection from step 1514 is not an occupancy detection at step 1516, the received message procedure 1500 simply exits. However, if the result of the detection is an occupancy detection at step 1516, and the dimmer switch 110 is in the vacant state at step 1518, the controller 214 changes to the occupied state at step 1520 and then initializes and starts the occupancy timer at step 1522. If the ambient light level (received in the digital messages at step 1510) is less than the ambient light level threshold stored in the memory 216 at step 1524, the controller 214 turns on the lighting load 104 at step 1526 and the received message procedure 1500 exits. If the ambient light level is not less than the ambient light level threshold at step 1524, then the received message procedure 1500 exits.

If the result of the detection is an occupancy detection at step 1516 and the dimmer switch 110 is in the occupied state at step 1518, the controller 214 restarts the occupancy timer at step 1528. If, at step 1530, the result is the first occupancy detection for the occupancy sensor 120 from which the digital messages were received at step 1512 since the dimmer switch 110 was last in the vacant state, the controller 214 determines whether the ambient light level is less than the ambient light level threshold at step 1524 and may turn on the lighting load at step 1526. Otherwise, the received message procedure 1500 simply exits.

Figure 16:
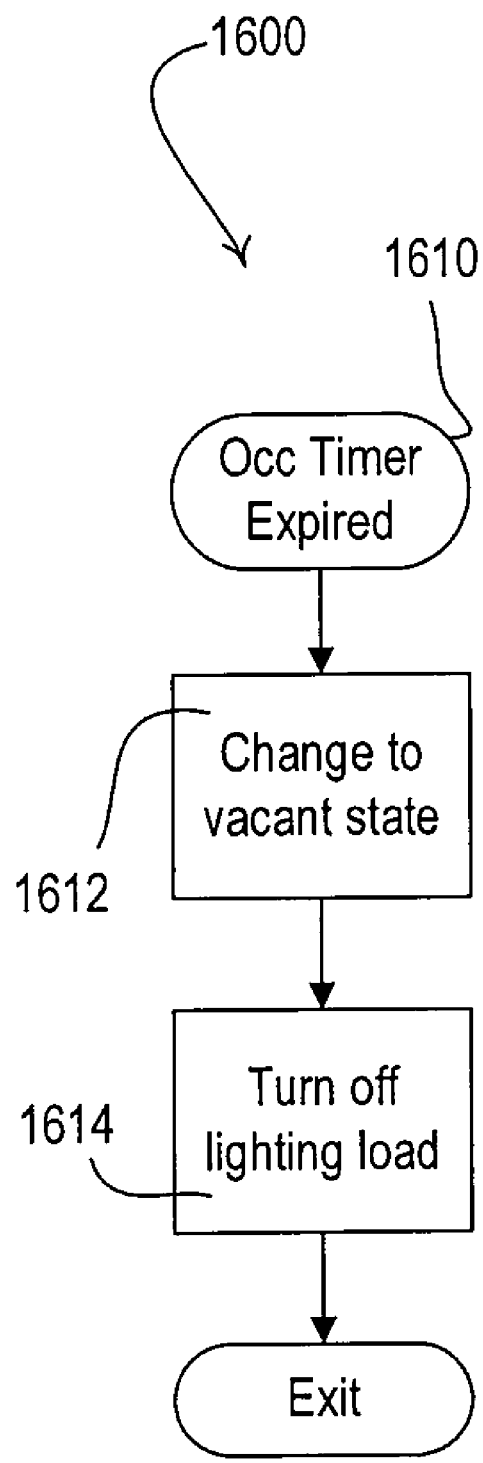
FIG. 16 is a flowchart of an occupancy timer procedure executed by the controller of the dimmer switch of FIG. 2A according to the second embodiment of the present invention.

FIG. 16 is a flowchart of an occupancy timer procedure 1600 executed by the controller 214 of the dimmer switch 110 when the occupancy timer expires at step 1610. Specifically, the controller 214 changes to the vacant state at step 1612 and turns off the lighting load 104 at step 1614 before the occupancy timer procedure 1600 exits.

Alternatively, the controller 230 of the occupancy sensor 120 could compare the ambient light level reading to three different ambient light level thresholds (e.g., high, medium, and low ambient light level thresholds) and then transmit the results of the comparisons to the dimmer switch 110 in a manner similar to that described above with response to the PIR occupancy detection comparisons. The dimmer switch 110 could then control the lighting load 104 based upon the resultant ambient light level threshold comparison corresponding to the ambient light level threshold stored in the memory 216.

Figure 17A:
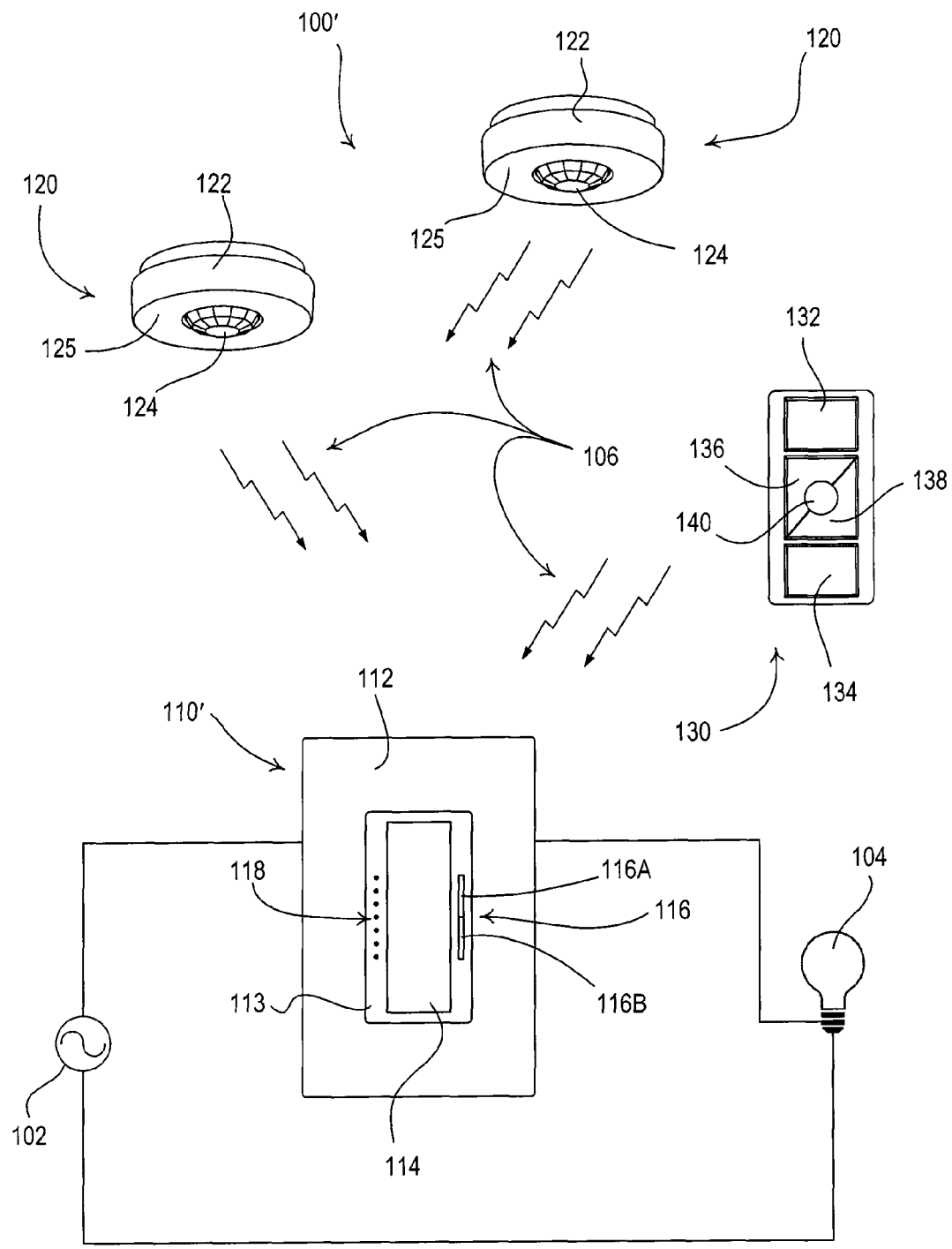
FIG. 17A is a simplified block diagram of a lighting control system having a dimmer switch, remote occupancy sensors, and a remote control for controlling the amount of power delivered to a lighting load according to a third embodiment of the present invention.

FIG. 17A is a simplified block diagram of a lighting control system 100' having a dimmer switch 110' according to a third embodiment of the present invention. The lighting control system 100' may additionally comprise one or more remote controls 130. The remote control 130 comprise a plurality of actuators: an on button 132, an off button 134, a raise button 136, a lower button 138, and a preset button 140 (for recalling a preset lighting intensity stored in the memory 216 of the dimmer switch 110'). Alternatively, the remote control 130 could comprise a plurality of preset buttons. The remote control 130 transmits digital messages via the RF signals 106 to the dimmer switch 110' in response to actuations of any of the actuators. The dimmer switch 110' is responsive to digital messages containing the serial number of the remote control 130 to which the dimmer switch is associated. The dimmer switch 110' is operable to turn on and to turn off the lighting load 104 in response to an actuation of the on button 132 and the off button 136, respectively. The dimmer switch 110' is operable to control the lighting load 104 to the preset intensity in response to an actuation of the preset button 134.

During the setup procedure of the RF load control system 100', the dimmer switch 110' is associated with one or more remote controls 130. A user simultaneously presses and holds the on button 132 on the remote control 130 and the toggle button 114 on the dimmer switch 110' to link the remote control 130 and the dimmer switch 110'. The user may simultaneously press and hold the off button 136 on the remote control 130 and the toggle button 114 on the dimmer switch 110' to unassociate the remote control 130 with the dimmer switch 110'. The configuration procedure for associating the remote control 130 with the dimmer switch 110' is described in greater detail in co-pending commonly-assigned U.S. patent application Ser. No. 11/559,166, filed Nov. 13, 2006, entitled RADIO-FREQUENCY LIGHTING CONTROL SYSTEM, the entire disclosure of which is hereby incorporated by reference.

Figure 17B:
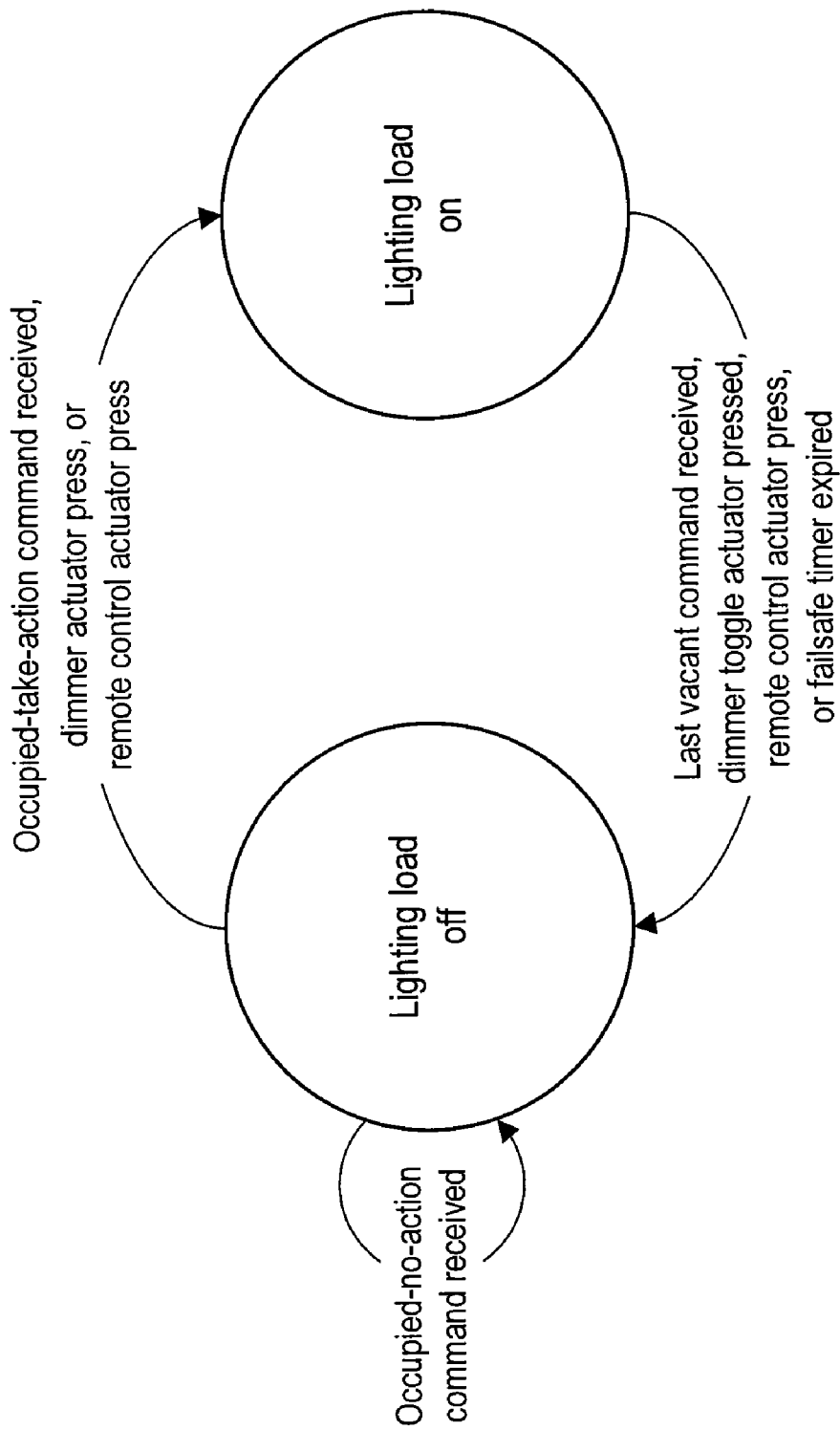
FIG. 17B is a simplified state diagram illustrating how the dimmer switch of the RF lighting control system of FIG. 17A controls the lighting load.

FIG. 17B is a simplified state diagram illustrating how the dimmer switch 110' of the lighting control system 100' controls the state of the lighting load 104 (i.e., between on and off). The dimmer switch 110' turns on the lighting load 104 when the first occupied-take-action command is received from one of the occupancy sensors 120, when one of the dimmer actuator buttons (i.e., the toggle actuator 114 and the intensity adjustment actuator 116) is actuated to turn on the lighting load, or when digital messages are received from the remote control 130, i.e. when one of the remote control actuators (e.g., the on button 132, the raise button 136, or the preset button 140 of the remote control) is actuated to turn on the lighting load 104. Further, the dimmer switch 110 turns off the lighting load 104 when the last vacant command is received from the occupancy sensors 120, when one of the dimmer actuator buttons is actuated to turn off the lighting load 104, when the failsafe timer expires, or when digital messages are received from the remote control 130, i.e. when one of the remote control actuators (e.g., the off button 134 of the remote control) is actuated to turn off the lighting load.

Figure 17C:
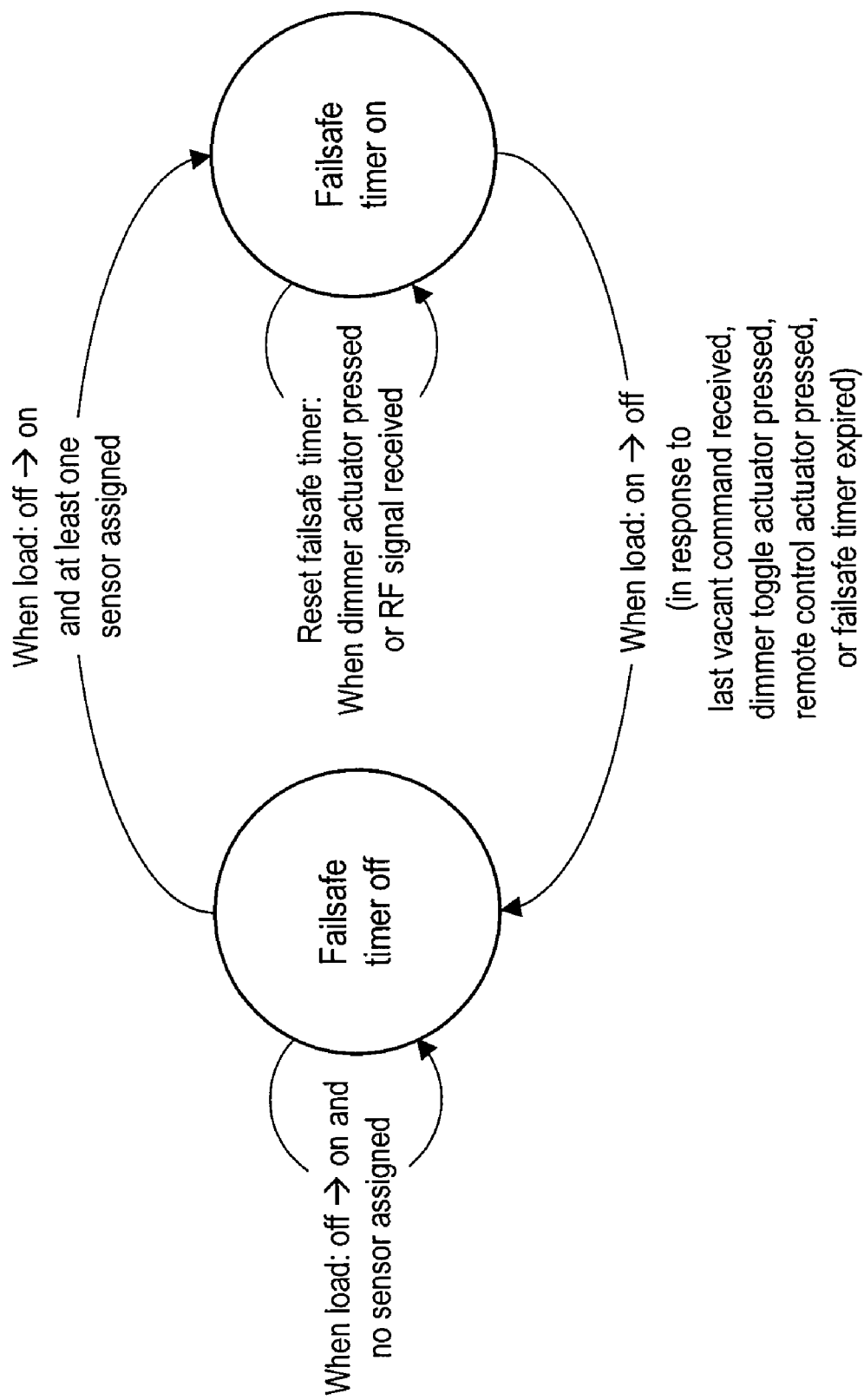
FIG. 17C is a simplified state diagram illustrating the state of a failsafe timer of one of the occupancy sensors of the RF lighting control system of FIG. 17A.

FIG. 17C is a simplified state diagram illustrating the state of the failsafe timer of the dimmer switch 110', which is similar to the state diagram of the failsafe timer as shown in FIG. 1C according to the first embodiment of the present invention. However, the dimmer switch 110' of the lighting control system 100' additionally starts the failsafe timer when digital messages to turn on the lighting load 104 are received from the remote control 130 and at least one occupancy sensor 120 is assigned to the dimmer switch 110'. The dimmer switch 110' restarts the failsafe timer when digital messages are received from any of the occupancy sensors 120 or remote controls 130 to which the dimmer switch is assigned. The dimmer switch 110' is also operable to stop the failsafe timer in response to receiving digital messages to turn off the lighting load 104 from the remote control 130.

Figure 18:
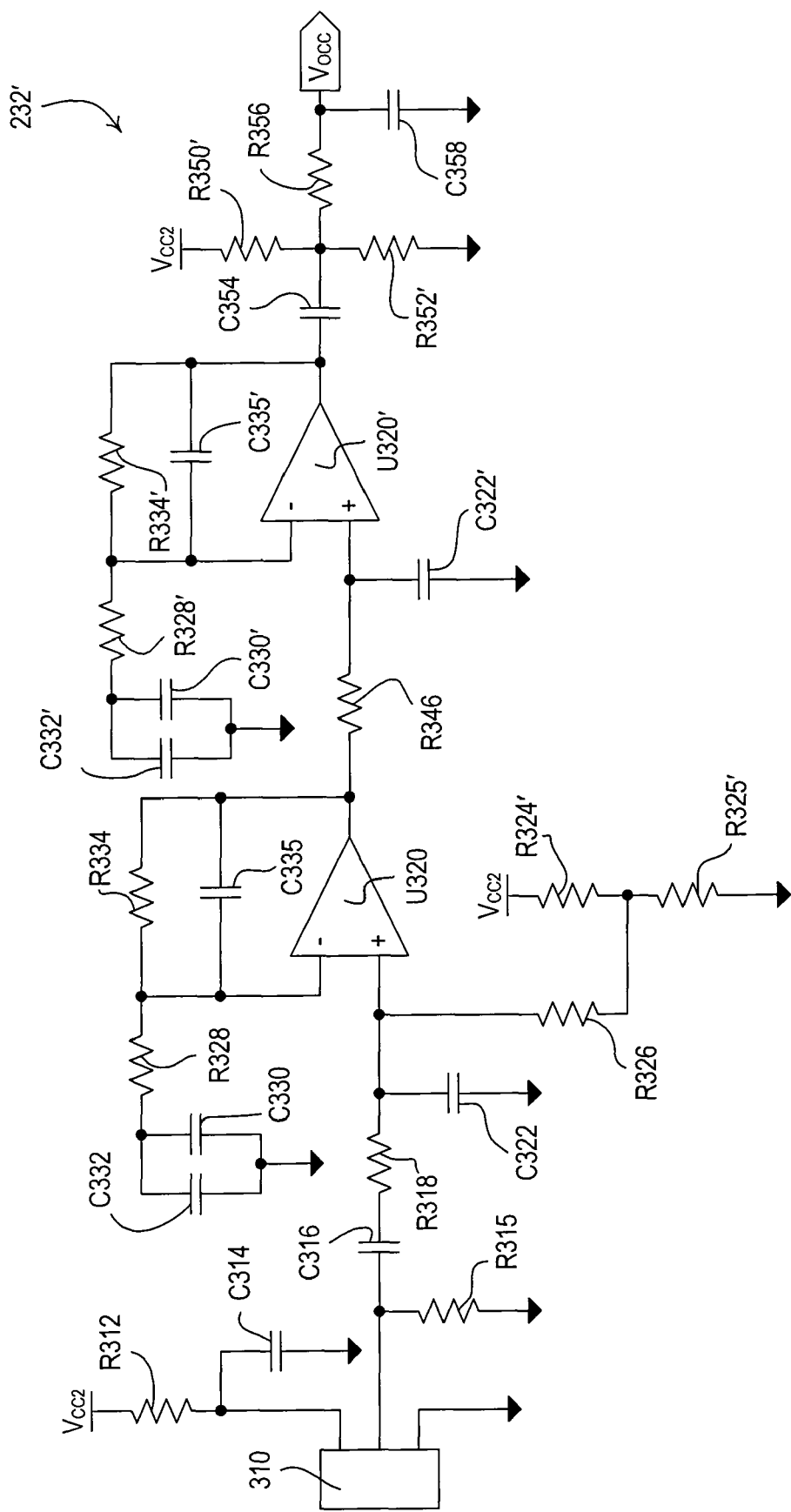
FIG. 18 is a simplified schematic diagram of an occupancy detector circuit 232' according to a fourth embodiment of the present invention.

FIG. 18 is a simplified schematic diagram of an occupancy detector circuit 232' according to a fourth embodiment of the present invention. The occupancy detector circuit 232' comprises a two-stage amplifier circuit having two amplifier stages and no buffer stages. Resistors R324', R325', R350', R352' have, for example, resistances of 1.5 MΩ. The occupancy detector circuit 232' has a gain of approximately 4900 and draws a current having a magnitude of approximately 5 μA or less from the second battery V2.

The present invention has been described with reference to the lighting control system 100 having a plurality of occupancy sensors 120 (i.e., the dimmer switch 100 is operable to both turn on and turn off the lighting load 104 in response to the occupancy sensors). However, the concepts of the present invention can also be applied to a lighting control system having a plurality of vacancy sensors in which the dimmer switch 110 would not turn on, but would only turn off, the lighting load 104 in response to the vacancy sensors. To implement this control with the lighting control system described in the flowcharts of FIGS. 5-12, the dimmer switch 110 could simply not turn on the lighting load 104 and not start the failsafe timer in response to receiving an occupied-take-action command (i.e., skip steps 1118 and 1120 of the received message procedure 1100 of FIG. 11). Alternatively, the vacancy sensors could simply transmit occupied-no-action commands rather that the occupied-take-action commands (at step 824 of the occupancy detection procedure 800 of FIG. 8). In both cases, the dimmer switch 100 would only turn on the lighting load 100 in response to a manual actuation of the toggle actuator 114 or the intensity adjustment actuator 116, using the dimmer actuator procedure 600 of FIGS. 6A and 6B.

While the present invention has been described with reference to the dimmer switch 110 for controlling the intensity of the lighting load 104, the concepts of the present invention could be applied to load control systems comprising other types of load control devices, such as, for example, fan-speed controls for fan motors, electronic dimming ballasts for fluorescent loads, and drivers for light-emitting diodes (LEDs). Further, the concepts of the present invention could be used to control other types of electrical loads, such as, for example, fan motors or motorized window treatments.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A radio-frequency load control system with occupancy sensing comprising:
   a load control device connected between an AC power source and an electrical load, said load control device containing an RF receiver circuit for receiving radio frequency signals; and
   first and second battery-powered occupancy sensors, each occupancy sensor fixable to a surface of a room in which said electrical load is located for transmitting an RF signal in response to the presence of an occupant in said room, said second occupancy sensor spaced from the location of said first occupancy sensor, each occupancy sensor comprising an enclosed plastic housing including at least one battery, a detector for sensing the presence or absence of occupants in said room, and a RF transmitter circuit for producing said RF signal which is modulated to indicate the presence or absence of said occupant in said room, the RF signals of said occupancy sensors having respective identifying information to identify themselves to the load control device;

wherein said load control device receives said RF signals transmitted by said occupancy sensors and controls the current supplied to said electrical load in a predetermined dependence on the detection of an occupancy or a vacancy in said room.

2. The system of claim 1, wherein said electrical load is a lighting load.

3. The system of claim 2, wherein said load control device is a wall-mounted dimmer.

4. The system of claim 3, wherein said wall-mounted dimmer has a toggle control actuator for turning said lighting load on and off, and an intensity adjustment actuator for adjustably controlling the amount of power delivered to said lighting load, said occupancy sensors remotely controlling said wall-mounted dimmer in response to the detected presence or absence of a room occupant.

5. The system of claim 1, wherein said battery-operated occupancy sensors are removably mountable to said surface of said room.

6. The system of claim 1, wherein said battery-operated occupancy sensors further comprise ambient light detectors, such that said occupancy sensors transmit said RF signal in accordance with the level of ambient light level within the area.

7. A sensor system for controlling a lighting load located within a room, said system comprising:

an RF-responsive light control device for turning on and turning off said lighting load; and at least first and second spaced occupancy sensors disposed to monitor occupancy in different areas of said room, each of said first and second sensors transmitting first and second respective occupied and vacant RF signals to said light control device in response to the sensing of a respective presence or absence of an occupant in said room;

wherein said light control device turns on said lighting load in response to receiving an occupied RF signal from either of said first or second sensors, and turns off said lighting load in response to receiving a vacant RF signal from both of said sensors.

8. The sensor system of claim 7, wherein said first and second spaced occupancy sensors are operable to delay for a timeout period the transmission of said vacant signals.

9. The sensor system of claim 7, wherein each of said first and second sensors includes an ambient light detector, such that said first and second sensors compare the output of said ambient light detector to a predetermined ambient light level and transmit an occupied-no-action RF signal if the ambient light is greater than said predetermined ambient light level, whereby the light control device does not change the condition of the lighting load due to receiving said RF occupied-no-action signal.

10. A load control system for controlling the amount of power delivered from an AC power source to an electrical load provided in a space, the load control system comprising:

a load control device adapted to be coupled in series electrical connection between the AC power source and the electrical load for control of the amount of power delivered to the electrical load, the load control device operable to receive wireless control signals and to control the amount of power delivered to the electrical load in response to the wireless control signals; and two occupancy sensors, each operable to independently detect an occupancy condition in the space and to transmit an occupied wireless control signal to the load control device in response to detecting the occupancy condition, the occupancy sensors further operable to transmit a vacant wireless control signal to the load control device in response to detecting a vacancy condition in the space;

wherein the load control device enables the delivery of power to the electrical load in response to receiving the occupied wireless control signal from at least one of the occupancy sensors, and ceases the delivery of power to the electrical load in response to receiving vacant control signals from both of the occupancy sensors.

11. The load control system of claim 10, wherein each of the occupancy sensors are characterized by a unique serial number, the load control device comprising a memory for storage of the serial numbers of the two occupancy sensors, the load control device responsive to wireless control signals including at least one of the serial numbers of the two occupancy sensors.

12. The load control system of claim 11, wherein the load control device keeps track of the occupancy sensors from which the load control device received the occupied wireless control signals.

13. The load control system of claim 12, wherein the load control device ceases the delivery of power to the electrical load in response to receiving vacant control signals from all of the occupancy sensors from which the load control device received the occupied wireless control signals.

14. The load control system of claim 10, wherein the electrical load is a lighting load and the load control device is a dimmer.

15. The load control system of claim 10, wherein each of the occupancy sensors transmits a third wireless control signal to the load control device in response to detecting a continued occupancy condition in the space, the load control device ceasing the delivery of power to the electrical load in response to determining that no wireless control signals have been received from one of the occupancy sensors for the length of a predetermined timeout period and receiving a vacant control signal from the other occupancy sensor.

16. A method of controlling the amount of power delivered from an AC power source to an electrical load provided in a space, the method comprising the steps of:

providing two occupancy sensors in the space;

detecting by one of the occupancy sensors an occupancy condition in the space;

transmitting by one of the occupancy sensors an occupied wireless control signal in response to the step of detecting the occupancy condition;

receiving the occupied wireless control signal from at least one of the occupancy sensors;

enabling the delivery of power to the electrical load in response to the step of receiving the occupied wireless control signal from at least one of the occupancy sensors;

detecting by one of the occupancy sensors a vacancy condition in the space;

transmitting by one of the occupancy sensors a vacant wireless control signal in response to the step of detecting a vacancy condition in the space;

receiving vacant control signals from both of the occupancy sensors; and ceasing the delivery of power to the electrical load in response to the step of receiving vacant control signals from both of the occupancy sensors.

17. A process of controlling a lighting load in a room dependent upon the occupancy or vacancy of the room, said process comprising the steps of:
providing first and second spaced occupancy sensors mounted within said room;
monitoring by said first and second occupancy sensors for the presence of one or more persons in said room;
transmitting by said first and second occupancy sensors respective RF signals including occupancy or vacancy information with an identifier of the respective sensor producing such information;
receiving said RF signals by a load control device;
turning on by said load control device said lighting load in response to receiving an occupied RF output signal from either said first or said second sensor; and
turning off by said load control device said lighting load in response to receiving vacant RF signals from both of said first and second sensors.

18. The process of claim 17, wherein said first and second sensors delay the transmission of a vacant RF signal for a timeout period after sensing a vacancy condition.

19. The process of claim 18, wherein said first and second light sensors monitor the ambient light in their respective areas of the room and separately transmit an occupied-no-action RF signal if the ambient light is larger than a given value, whereby the lighting load remains in its last condition in response to the transmission of the occupied-no-action RF signal.

20. A load control system for controlling the amount of power delivered from an AC power source to an electrical load provided in a space, the load control system comprising:
a load control device adapted to be coupled in series electrical connection between the AC power source and the electrical load for control of the amount of power delivered to the electrical load, the load control device operable to receive wireless control signals and to control the amount of power delivered to the electrical load in response to the wireless control signals; and
an occupancy sensor operable to detect an occupancy condition in the space and to transmit a first wireless control signal to the load control device in response to detecting the occupancy condition, the load control device operable to enable the delivery of power to the electrical load in response to the first wireless control signal, the occupancy sensor further operable to transmit a second wireless control signal to the load control device in response to detecting a continued occupancy condition in the space;
wherein the load control device is operable to determine that no wireless control signals have been received from the occupancy sensor for the length of a predetermined timeout period and to subsequently cease the delivery of power to the electrical load.

21. The load control system of claim 20, wherein the load control device initializes a failsafe timer with the predetermined timeout period and restarts the failsafe timer in response to receiving the second wireless control signals from the occupancy sensor, the load control device operable to cease the delivery of power to the electrical load when the failsafe timer expires.

22. The load control system of claim 21, wherein the occupancy sensor is characterized by a unique serial number, the load control device comprising a memory for storage of the serial number of the occupancy sensor, the load control device responsive to wireless control signals including the serial number of the occupancy sensor.

23. The load control system of claim 22, wherein the load control device comprises a first actuator and the occupancy sensor comprises a second actuator, the load control device operable to store the serial number of the occupancy sensor in the memory in response to simultaneous actuations of the first and second actuators.

24. The load control system of claim 23, wherein the electrical load is a lighting load.

25. The load control system of claim 24, wherein the load control device turns on the lighting load in response to an actuation of the first actuator, and starts the failsafe timer when the lighting load is turned on and the serial number of the occupancy sensor is stored in the memory.

26. The load control system of claim 21, wherein the second wireless control signal comprises an occupied-no-action command.

27. The load control system of claim 26, wherein the first wireless control signal comprises an occupied-take-action command.

28. The load control system of claim 21, wherein the load control device enables the delivery of power to the electrical load and starts the failsafe timer in response to receiving the first wireless control signal.

29. The load control system of claim 20, further comprising:
a remote control comprising an actuator and operable to transmit a third wireless control signal to the load control device in response to an actuation of the actuator, the load control device operable to control the amount of power delivered to the electrical load in response to the third wireless control signal.

30. The load control system of claim 29, wherein the load control device is operable to determine that no wireless control signals have been received from the remote control for the length of the predetermined timeout period and to subsequently cease the delivery of power to the electrical load.

31. A method of controlling the amount of power delivered from an AC power source to an electrical load provided in a space, the method comprising the steps of:
providing an occupancy sensor in the space;
detecting by the occupancy sensor an occupancy condition in the space;
transmitting by the occupancy sensor a first wireless control signal in response to the step of detecting the occupancy condition;
enabling the delivery of power to the electrical load in response to the first wireless control signal;
detecting by the occupancy sensor a continued occupancy condition in the space;
transmitting by the occupancy sensor a second wireless control signal in response to the step of detecting a continued occupancy condition in the space;
determining that no wireless control signals have been received from the occupancy sensor for the length of a predetermined timeout period; and
ceasing the delivery of power to the electrical load in response to the step of determining that no wireless control signals have been received.

32. The method of claim 31, further comprising the steps of:
initializing a failsafe timer with the predetermined timeout period; and
restarting the failsafe timer in response to receiving the second wireless control signals from the occupancy sensor;

wherein the step of ceasing the delivery of power further comprises ceasing the delivery of power to the electrical load when the failsafe timer expires.

33. The method of claim 32, further comprising the step of:
starting the failsafe timer in response to receiving the first wireless control signal.

34. The method of claim 32, further comprising the steps of:
pressing a button;
enabling the delivery of power to the electrical load in response to the step of pressing a button; and
starting the failsafe timer in response to the step of pressing a button.

35. A wall or ceiling mounted occupancy sensor comprising:
at least one battery;
a controller coupled to said battery;
a PIR occupancy detector for sensing the presence or absence of an occupant in a room, said occupancy detector circuit coupled to said controller and delivering occupancy or vacancy information to said controller;
an RF transmitter coupled to said battery and said controller for transmitting an RF signal containing information related to the presence or absence of an occupant in said room;
an ambient light detector coupled to said controller, such that said controller compares the level of ambient light within the area to an ambient light threshold, whereby said RF signal transmitted by said RF transmitter is modified in accordance with the comparison of said level of ambient light within the area and said ambient light threshold; and
an enclosure housing containing said battery, said controller, and said PIR detector, said RF transmitter, and said ambient light detector, said housing having mounting structure for mounting said sensor to a wall or ceiling surface of a room.

36. The sensor of claim 35, further comprising:
an opening in said housing; and
a lens in said opening for exposing said PIR detector to infrared energy produced by occupants of said room.

37. The sensor of claim 35, wherein said RF signal contains information for uniquely identifying said sensor.

38. The sensor of claim 35, wherein said mounting structure includes a mounting plate removably fastened to said housing and permitting the mounting of said sensor to selected positions within said room to produce optimal operation of the sensor.

39. A load control system for controlling the amount of power delivered from an AC power source to an electrical load provided in a space, the load control system comprising:
a load control device adapted to be coupled in series electrical connection between the AC power source and the electrical load for control of the amount of power delivered to the electrical load, the load control device operable to receive wireless control signals and to control the amount of power delivered to the electrical load in response to the wireless control signals; and
an occupancy sensor comprising an occupancy detector for detecting an occupancy condition in the space and an ambient light level detector for measuring the ambient light level in the space;
wherein the occupancy sensor compares the ambient light level to an ambient light level threshold, transmits a first predetermined wireless control signal to the load control device in response to determining that the ambient light level is less than the threshold, and transmits a second predetermined wireless control signal to in response to determining that the ambient light level is greater than the threshold.

40. The load control system of claim 39, wherein the occupancy sensor periodically determines if the space is occupied.

41. The load control system of claim 40, wherein the occupancy sensor measures the ambient light level only when the occupancy sensor first detects the occupancy condition in the space.

42. The load control system of claim 40, wherein the occupancy sensor transmits the second wireless control signal to the load control device in response to detecting a continued occupancy condition in the space.

43. The load control system of claim 39, wherein the load control device enables the delivery of power to the electrical load in response to receiving the first wireless control signal.

44. The load control system of claim 39, wherein the load control device maintains constant the amount of power delivered to the electrical load in response to receiving the second wireless control signal.

45. A load control system for controlling the amount of power delivered from an AC power source to an electrical load provided in a space, the load control system comprising:
a load control device adapted to be coupled in series electrical connection between the AC power source and the electrical load for control of the amount of power delivered to the electrical load, the load control device operable to receive wireless control signals and to control the amount of power delivered to the electrical load in response to the wireless control signals;
an occupancy sensor comprising an occupancy detector circuit for generating an occupancy control signal representative of an occupancy condition in the space, a controller responsive to the occupancy control signal, and a wireless transmitter operable to transmit the wireless control signals, the controller operable to determine whether the occupancy condition is presently occurring in the space based upon each of a plurality of occupancy criteria and to generate a result for each of the determinations of the occupancy condition at each of the plurality of occupancy criteria, the occupancy sensor operable to transmit to the load control device each of the results of the determinations of the occupancy condition at each of the plurality of occupancy criteria;
wherein the load control device is characterized by a predetermined one of the plurality of occupancy criteria, the load control device operable to select one of the results of each of the determinations of the occupancy condition at each of the plurality of occupancy criteria based upon the predetermined one of the plurality of occupancy criteria, the load control device operable to control the amount of power delivered to the electrical load in response to the selected results of the determination of the occupancy condition.

46. The load control system of claim 45, wherein the controller is operable to transmit a plurality of wireless control signals with one wireless signal for each of the results of the determinations of the occupancy condition at each of the plurality of occupancy criteria.

47. The load control system of claim 45, wherein the plurality of occupancy criteria comprise a plurality of different occupancy voltage thresholds.

48. The load control system of claim 45, predetermined one of the plurality of occupancy criteria of the load control device is selectable by a user.

49. The load control system of claim 45, wherein the occupancy sensors each further comprise ambient light detectors for measuring the ambient light level in the space, the occupancy sensors each operable to transmit the ambient light level to the load control device, the load control device characterized by a predetermined ambient light level threshold, the load control device operable to compare the ambient light level to the ambient light level threshold and to control the amount of power delivered to the electrical load in response to the comparison.

50. A method of controlling the amount of power delivered from an AC power source to an electrical load provided in a space, the method comprising the steps of:
   generating an occupancy control signal representative of an occupancy condition in the space;
   determining whether the occupancy condition is presently occurring in the space based upon each of a plurality of occupancy criteria;
   generating a result for each of the determinations of the occupancy condition at each of the plurality of occupancy criteria;
   transmitting each of the results of the determinations of the occupancy condition at each of the plurality of occupancy criteria;
   selecting one of the results of each of the determinations of the occupancy condition at each of the plurality of occupancy criteria based upon a predetermined one of the plurality of occupancy criteria; and
   controlling the amount of power delivered to the electrical load in response to the step of selecting one of the results.

* * * * *

US008009042C1

(12) INTER PARTES REEXAMINATION CERTIFICATE (1048th)
United States Patent
Steiner et al.

(10) Number: US 8,009,042 C1
(45) Certificate Issued: Feb. 6, 2015

(54) RADIO-FREQUENCY LIGHTING CONTROL SYSTEM WITH OCCUPANCY SENSING

(75) Inventors: James P. Steiner, Royersford, PA (US); Andrew Peter Schmalz, Macungie, PA (US); Andrew Ryan Offenbacher, Quakertown, PA (US); Adam J. Schrems, Allentown, PA (US); Brian Raymond Valenta, Macungie, PA (US)

(73) Assignee: Lutron Electronics Co., Inc., Coopersburg, PA (US)

Reexamination Request:
No. 95/001,821, Dec. 2, 2011

Reexamination Certificate for:
Patent No.: 8,009,042
Issued: Aug. 30, 2011
Appl. No.: 12/203,518
Filed: Sep. 3, 2008

(51) Int. Cl.
*G08B 13/00* (2006.01)

(52) U.S. Cl.
USPC .............................. 340/541; 315/159; 315/291

(58) Field of Classification Search
None
See application file for complete search history.

(56) References Cited

To view the complete listing of prior art documents cited during the proceeding for Reexamination Control Number 95/001,821, please refer to the USPTO's public Patent Application Information Retrieval (PAIR) system under the Display References tab.

*Primary Examiner* — Linh M Nguyen

(57) ABSTRACT

A load control system controls an electrical load provided in a space and comprises a load control device and one or more occupancy sensors. The load control device controls the load in response to the wireless control signals received from the occupancy sensors. Each occupancy sensor transmits an occupied control signal to the load control device in response to detecting an occupancy condition in the space and a vacant control signal to the load control device in response to detecting a vacancy condition. The load control device turns on the load in response to receiving the occupied control signal from at least one of the occupancy sensors, and turns off the load in response to receiving vacant control signals from both of the occupancy sensors. The load control device is operable to determine that no wireless control signals have been received from the occupancy sensors for the length of a predetermined timeout period and to subsequently turn off the load.

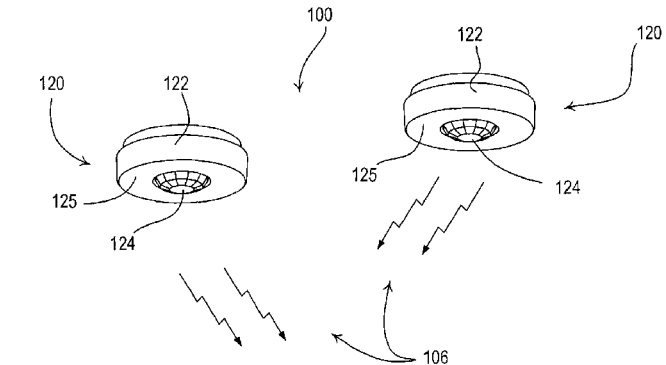

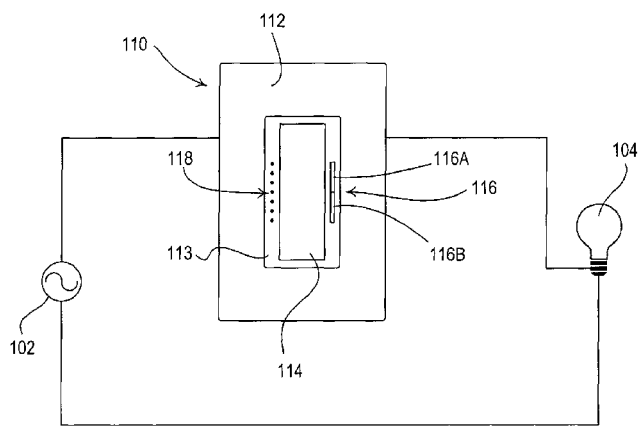

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-11, 14, 16-19, 35-40 and 42-44 are cancelled.

Claims 12, 13, 15, 20-34, 41 and 45-50 were not reexamined.

\* \* \* \* \*